United States Patent
Tie et al.

(10) Patent No.: US 12,438,878 B2
(45) Date of Patent: Oct. 7, 2025

(54) METHOD AND DEVICE FOR IDENTITY AUTHENTICATION

(71) Applicant: CHINA IWNCOMM CO., LTD., Shaanxi (CN)

(72) Inventors: Manxia Tie, Shaanxi (CN); Jun Cao, Shaanxi (CN); Xiaolong Lai, Shaanxi (CN); Xiaorong Zhao, Shaanxi (CN); Qin Li, Shaanxi (CN); Bianling Zhang, Shaanxi (CN); Guoqiang Zhang, Shaanxi (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 129 days.

(21) Appl. No.: 18/269,617

(22) PCT Filed: Dec. 21, 2021

(86) PCT No.: PCT/CN2021/140039
§ 371 (c)(1),
(2) Date: Jun. 26, 2023

(87) PCT Pub. No.: WO2022/135386
PCT Pub. Date: Jun. 30, 2022

(65) Prior Publication Data
US 2024/0323188 A1    Sep. 26, 2024

(30) Foreign Application Priority Data
Dec. 26, 2020  (CN) .......................... 202011569205.3

(51) Int. Cl.
H04L 29/06    (2006.01)
H04L 9/06     (2006.01)
(Continued)

(52) U.S. Cl.
CPC ............ *H04L 63/10* (2013.01); *H04L 9/0618* (2013.01); *H04L 9/3247* (2013.01)

(58) Field of Classification Search
CPC ..... H04L 63/10; H04L 9/0618; H04L 9/3247; H04L 63/04; H04L 63/0407;
(Continued)

(56) References Cited

U.S. PATENT DOCUMENTS

| 11,265,721 B1* | 3/2022 | Satpathy ................ G02B 30/22 |
| 2006/0095767 A1* | 5/2006 | Krishnamurthi ...... H04L 63/166 713/168 |
| 2020/0195633 A1* | 6/2020 | Sham ................. H04W 12/069 |

FOREIGN PATENT DOCUMENTS

| CN | 1949709 A | 4/2007 |
| CN | 101136748 A | 3/2008 |

(Continued)

*Primary Examiner* — Malcolm Cribbs
(74) *Attorney, Agent, or Firm* — ArentFox Schiff LLP; Michael Fainberg

(57) ABSTRACT

A method and device for identity authentication. An authentication access controller (AAC) acquires an identity ciphertext message transmitted by a requesting device (REQ), the identity ciphertext message comprising an identity information ciphertext of the REQ, the AAC decrypts the identity information ciphertext of the REQ to generate a digital certificate ($Cert_{REQ}$) of the REQ, transmits a first authentication request message comprising the $Cert_{REQ}$ to a first authentication server, and receives a first authentication response message transmitted by the first authentication server, the first authentication response message comprising authentication result information and a digital signature of the first authentication server, the AAC utilizes a public key of the first authentication server to verify the digital signature of the first authentication server, and if successfully verified, then the AAC determines an identity authentication
(Continued)

result for the REQ on the basis of the verification result of the $Cert_{REQ}$ in the authentication result information.

20 Claims, 8 Drawing Sheets

(51) Int. Cl.
*H04L 9/32* (2006.01)
*H04L 9/40* (2022.01)

(58) Field of Classification Search
CPC ............. H04L 63/0414; H04L 63/0421; H04L 63/0428; H04L 63/0435; H04L 63/08; H04L 63/0823; H04L 63/20; H04L 63/205; H04W 12/06; H04W 12/069
See application file for complete search history.

(56) References Cited

FOREIGN PATENT DOCUMENTS

| | | |
|---|---|---|
| CN | 101409621 A | 4/2009 |
| CN | 102752306 A | 10/2012 |
| EP | 3299984 A1 | 3/2018 |

* cited by examiner

METHOD AND DEVICE FOR IDENTITY AUTHENTICATION

CROSS REFERENCE TO RELATED APPLICATIONS

The present application is a National Stage of International Application No. PCT/CN2021/140039, filed on Dec. 21, 2021, which claims priority to Chinese patent application No. 202011569205.3 filed on Dec. 26, 2020 to China National Intellectual Property Administration, the entire contents of which are incorporated herein by reference.

FIELD

The present application relates to the technical field of network communication security, in particular to a method and device for identity authentication.

BACKGROUND

In a communication network, a REQuester may access the network through an authentication access controller. In some cases with a high demand for security, the authentication access controller needs to authenticate an identity of the REQuester, so as to ensure that the REQuester accessing the network belongs to a legal user. In addition, in a block chain technology, node-to-node transmission also needs to establish a trust relationship between different nodes, so identity authentication for the nodes is also very important.

In a process of identity authentication for the REQuester, the REQuester needs to provide its own identity information for identity authentication. However, such identity information generally carries private and sensitive information, such as ID numbers, home addresses and bank card information. Moreover, in a process of practical applications, the identity information of the REQuester usually may be included in a digital certificate, and the digital certificate is used as an identity credential.

If the identity information of the REQuester is intercepted by an attacker for illegal purposes in the process of identity authentication for the REQuester, it will pose a significant security risk to the authentication access controller, the REQuester and the network.

SUMMARY

In order to solve the above technical problems, the present application provides a method and device for identity authentication, which involves an authentication server to ensure confidentiality of entity identity related information while realizing one-way identity authentication for a REQuester by an authentication access controller.

In a first aspect, an embodiment of the present application provides a method for identity authentication, including: acquiring, by an authentication access controller, an identity ciphertext message transmitted by a REQuester, wherein the identity ciphertext message includes identity information ciphertext of the REQuester, and the identity information ciphertext is generated by encrypting information including a digital certificate of the REQuester using a message encryption secret key; decrypting, by the authentication access controller, the identity information ciphertext using the message encryption secret key to obtain the digital certificate of the REQuester; transmitting, by the authentication access controller, a first authentication request message to a first authentication server trusted by the authentication access controller, wherein the first authentication request message includes the digital certificate of the REQuester; receiving, by the authentication access controller, a first authentication response message transmitted by the first authentication server, wherein the first authentication response message includes authentication result information and a digital signature of the first authentication server, and the authentication result information includes a verification result for the digital certificate of the REQuester; verifying, by the authentication access controller using a public key of the first authentication server, the digital signature of the first authentication server; and determining, by the authentication access controller, an identity authentication result of the REQuester according to the verification result for the digital certificate if the verification is successful.

In a second aspect, an embodiment of the present application provides an authentication access controller, including: an acquiring unit, configured to acquire an identity ciphertext message transmitted by a REQuester, wherein the identity ciphertext message includes identity information ciphertext of the REQuester, and the identity information ciphertext is generated by encrypting information including a digital certificate of the REQuester using a message encryption secret key; a decrypting unit, configured to decrypt the identity information ciphertext using the message encryption secret key to obtain the digital certificate of the REQuester; a first transmitting unit, configured to transmit a first authentication request message to a first authentication server trusted by the authentication access controller, wherein the first authentication request message includes the digital certificate of the REQuester; a receiving unit, configured to receive a first authentication response message transmitted by the first authentication server, wherein the first authentication response message includes authentication result information and a digital signature of the first authentication server, and the authentication result information includes a verification result for the digital certificate of the REQuester; a first verifying unit, configured to verify, using a public key of the first authentication server, the digital signature of the first authentication server; and a first determining unit, configured to determine, when the verification for the digital signature of the first authentication server is successful, an identity authentication result of the REQuester according to the verification result for the digital certificate.

In a third aspect, an embodiment of the present application provides a REQuester, including: an encrypting unit, configured to encrypt information including a digital certificate of the REQuester by using a message encryption secret key to generate identity information ciphertext; and a transmitting unit, configured to transmit an identity ciphertext message to an authentication access controller, wherein the identity ciphertext message includes the identity information ciphertext of the REQuester.

In a fourth aspect, an embodiment of the present application provides an authentication access controller, including: a memory, configured to store a program instruction; and a processor, configured to call the program instruction stored in the memory to execute the method on a side of the authentication access controller as described in the first aspect according to the obtained program.

In a fifth aspect, an embodiment of the present application provides a REQuester, including: a memory, configured to store a program instruction; and a processor, configured to call the program instruction stored in the memory to execute the method on a side of the authentication access controller as described in the first aspect according to the obtained program.

From the above technical solution, it can be seen that when identity information is transmitted between the REQuester and the authentication access controller, confidential processing is performed on the identity information of the REQuester, exposure of the identity information in a transmission process may be prevented, and it is ensured that private and sensitive information cannot be obtained by an attacker. In addition, by involving the authentication server, while ensuring the confidentiality of the entity identity related information, real-time one-way identity authentication for the REQuester by the authentication access controller is realized, and a foundation is laid for ensuring that only legal users can access the network.

BRIEF DESCRIPTION OF THE DRAWINGS

In order to explain embodiments of the present application or technical solutions in the prior art more clearly, accompanying drawings that need to be used in the embodiments or descriptions of the prior art will be briefly introduced below. Apparently, the accompanying drawings in the following descriptions are only some embodiments of the present application, and for those ordinarily skilled in the art, other accompanying drawings may further be obtained according to these accompanying drawings without creative labor.

DETAILED DESCRIPTION OF THE EMBODIMENTS

Figure 1:
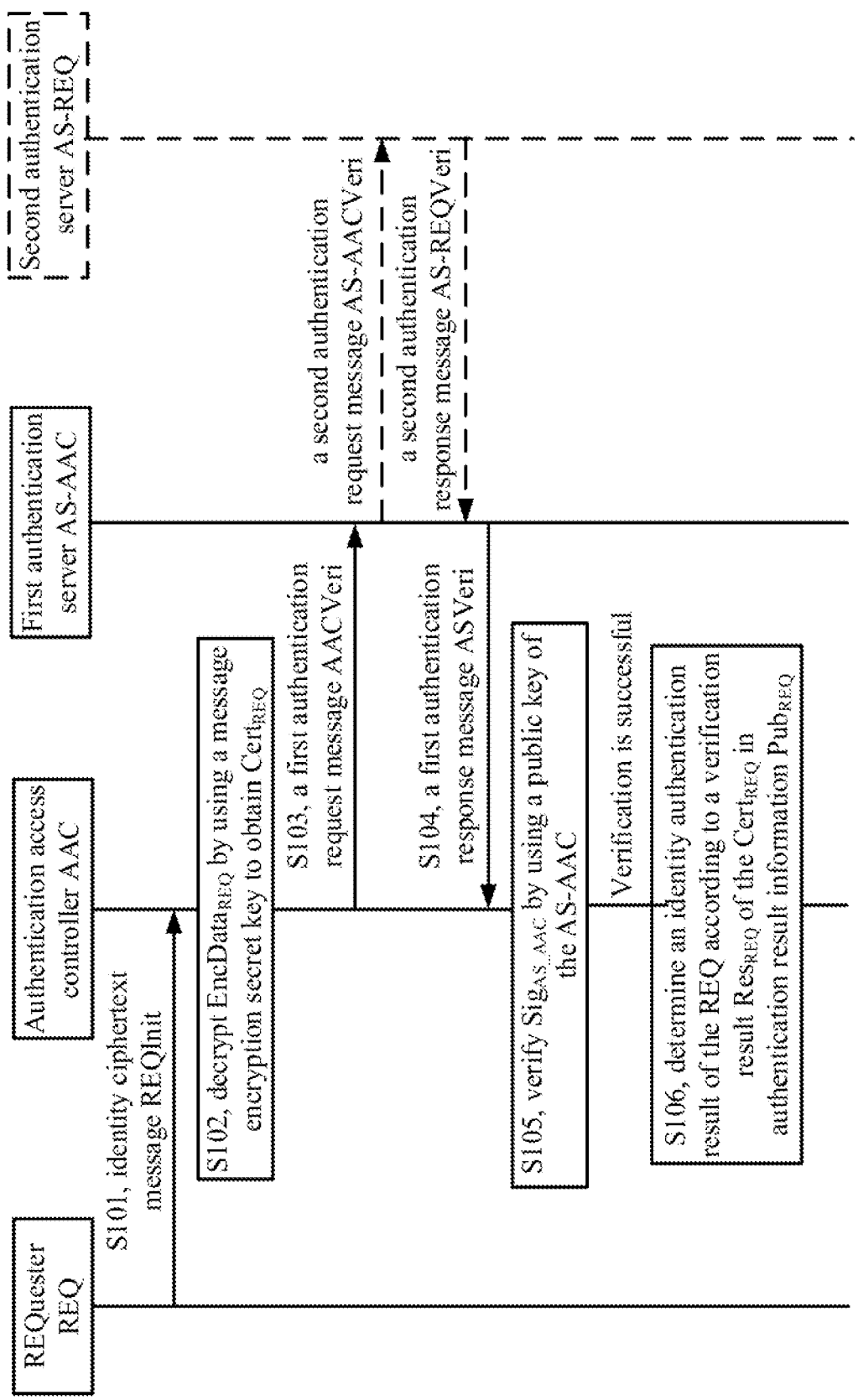
FIG. 1 is a schematic diagram of a method for identity authentication provided by an embodiment of the present application.

In a communication network, a REQuester may access the network through an authentication access controller. In order to ensure that the REQuester accessing the network belongs to a legal user, the authentication access controller needs to authenticate the identity of the REQuester.

Taking current wireless communication and mobile communication scenarios as an example, in a scenario where the REQuester accesses a wireless network through the authentication access controller, the REQuester may be a mobile phone, a personal digital assistant (PDA), a tablet and other terminal devices, and the authentication access controller may be a wireless access point, a wireless router and other network side devices. In a scenario where the REQuester accesses the 4th/5th generation mobile communication technology (4G/5G) network through the authentication access controller, the REQuester may be a mobile phone, a tablet and other terminal devices, and the authentication access controller may be a base station and other network side devices. Certainly, the present application is also applicable to various data communication scenarios such as other wired networks and short range communication networks.

However, in a process of authenticating the identity of the REQuester, the REQuester needs to provide its own identity information for authentication, for example, the identity information may be a digital certificate of the REQuester, and the digital certificate usually carries ID numbers, home addresses, bank card information and other private and sensitive information. If an attacker intercepts the digital certificate, the private and sensitive information in the digital certificate may be acquired and used for illegal purposes, which may pose a significant security risk to the authentication access controller, the REQuester and even the network.

In order to solve the above technical problems, an embodiment of the present application provides a method for identity authentication, including: an authentication access controller acquires an identity ciphertext message transmitted by a REQuester, wherein the identity ciphertext message includes identity information ciphertext of the REQuester, and the identity information ciphertext is generated by encrypting information including a digital certificate of the REQuester using a message encryption secret key. In this way, the security of the identity information of the REQuester transmitted between the REQuester and the authentication access controller is ensured through the identity ciphertext message. Then, the authentication access controller decrypts the identity information ciphertext by using a message encryption secret key to obtain a digital certificate of the REQuester, transmits a first authentication request message including the digital certificate of the REQuester to a first authentication server trusted by the authentication access controller, and receives a first authentication response message transmitted by the first authentication server, wherein the first authentication response message includes authentication result information and a digital signature of the first authentication server, and the authentication result information includes a verification result for the digital certificate of the REQuester; and the authentication access controller verifies, utilizing a public key of the first authentication server, the digital signature of the first authentication server, and if the verification is successful, the authentication access controller determines an identity authentication result for the REQuester according to the verification result for the digital certificate.

It can be understood that the authentication result information mentioned in the embodiment of the present application is obtained by legality verification performed by the authentication server trusted by the REQuester on the digital certificate of the REQuester. The above is only an example of the REQuester, the authentication access controller and the authentication server, and should not be understood as a limitation to the REQuester, the authentication access controller and the authentication server. In other possible implementations of the embodiment of the present application, the REQuester, the authentication access controller and the authentication server may further be other devices.

The method for identity authentication provided by the embodiment of the present application realizes one-way identity authentication for the authentication access controller to the REQuester (REQ authentication with an unauthenticated AAC, RAUA).

For the convenience of introduction, in the embodiment of the present application, a REQuester (REQ), an authentication access controller (AAC) and an authentication server (AS) will be taken as an example to introduces the method for identity authentication of the present application.

The AS is a trusted third-party entity that holds a digital certificate and private keys corresponding to the digital certificate that comply with ISO/IEC 9594-8/ITU X.509, other standards or technical system regulations. The AS trusted by the AAC is called a first authentication server AS-AAC, and the AS trusted by the REQ is called a second authentication server AS-REQ. When the AS-AAC is different from the AS-REQ, the AS-AAC and the AS-REQ trust each other and know each other's digital certificates or public keys in the digital certificates.

The REQ may be an endpoint participating in the process of identity authentication, establishing a connection with the AAC, accessing services provided by the AAC and accessing the AS through the AAC. The REQ holds a digital certificate and a private key corresponding to the digital certificate that comply with ISO/IEC 9594-8/ITU X.509, other standards or technical system regulations, and the AS-REQ has the ability to verify the legality of the digital certificate of the REQ. The AAC may be another endpoint participating in the process of identity authentication, establishing a connection with the REQ, providing services and communicating with the REQ, and may directly access the AS-AAC, and the AAC knows the digital certificate or the public key in the digital certificate of the AS-AAC.

A method for identity authentication provided by an embodiment of the present application will be explained in conjunction with FIG. 1 below, and the method includes the following.

S101, an AAC acquires an identity ciphertext message REQInit transmitted by an REQ.

The REQInit includes identity information ciphertext $EncData_{REQ}$ of the REQ. The $EncData_{REQ}$ is generated by encrypting information including a digital certificate $Cert_{REQ}$ of the REQ by the REQ using a message encryption secret key and adopting a symmetric encryption algorithm. Therefore, in a process of transmitting identity information between the REQ and the AAC, confidential processing is performed on the identity information of the REQ, and exposure of the identity information of the REQ in the transmission process is prevented. The message encryption secret key may be obtained by negotiation between the REQ and the AAC, and may also be pre-shared by the REQ and the AAC. An implementation method for negotiating the message encryption secret key between the REQ and the AAC will be i introduced later.

S102, the AAC decrypts the $EncData_{REQ}$ by using the message encryption secret key to obtain $Cert_{REQ}$.

Due to the fact that the $EncData_{REQ}$ is obtained by encrypting the information including the $Cert_{REQ}$ by the REQ using the message encryption secret key and adopting the symmetric encryption algorithm, after the AAC receives the $EncData_{REQ}$ transmitted by the REQ, the AAC may decrypt the $EncData_{REQ}$ by using the message encryption secret key and adopting the symmetric encryption algorithm to obtain the $Cert_{REQ}$.

S103, the AAC transmits a first authentication request message AACVeri to a AS-AAC trusted by the AAC.

The AACVeri includes the $Cert_{REQ}$, so as to verify the legality of the $Cert_{REQ}$ through the AS-AAC.

It needs to be illustrated that, when the first authentication server AS-AAC trusted by the AAC and the second authentication server AS-REQ trusted by the REQ are the same one authentication server, the authentication server jointly trusted by the REQ and the AAC may be represented by AS-AAC (of course, it may also be AS-REQ). In this case, the AS-AAC (of course, it may also be represented as AS-REQ) performs legality verification on the $Cert_{REQ}$ to obtain a verification result $Res_{REQ}$, generates authentication result information $Pub_{REQ}$ according to information including the $Res_{REQ}$, calculates to-be-signed data including the $Pub_{REQ}$ to generate a digital signature $Sig_{AS\_AAC}$ (of course, it may also be represented as $Sig_{AS\_REQ}$) of the AS-AAC (of course, it may also be represented as AS-REQ), and generates a first authentication response message ASVeri according to information including the $Pub_{REQ}$ and the $Sig_{AS\_AAC}$ (of course, it may also be represented as $Sig_{AS\_REQ}$).

When the first authentication server AS-AAC trusted by the AAC and the second authentication server AS-REQ trusted by the REQ are two different authentication servers, in this case, after the AS-AAC receives the first authentication request message AACVeri, the AS-AAC transmits a second authentication request message AS-AACVeri to the AS-REQ, the AS-AACVeri includes the $Cert_{REQ}$ in the AACVeri, and the AS-REQ performs legality verification on the $Cert_{REQ}$ to obtain a verification result $Res_{REQ}$, generates authentication result information $Pub_{REQ}$ according to information including the $Res_{REQ}$, and calculates to-be-signed data including the $Pub_{REQ}$ to generate a digital signature $Sig_{AS\_REQ}$ of the AS-REQ. Then, the AS-AAC receives the second authentication response message AS-REQVeri transmitted by the AS-REQ, and the AS-REQVeri includes the $Pub_{REQ}$ and the $Sig_{AS\_REQ}$. The AS-AAC verifies, using the public key of the AS-REQ, the $Sig_{AS\_REQ}$; after verification is successful, the AS-AAC calculates the to-be-signed data including the $Pub_{REQ}$ to generate the digital signature $Sig_{AS\_AAC}$ of the AS-AAC, and generates the first authentication response message ASVeri according to the information including the $Pub_{REQ}$ and the $Sig_{AS\_AAC}$.

S104, the AAC receives the first authentication response message ASVeri transmitted by the AS-AAC.

The ASVeri includes the authentication result information $Pub_{REQ}$ and the digital signature $Sig_{AS\_AAC}$ of the AS-AAC. The $Pub_{REQ}$ includes the verification result $Res_{REQ}$ of the $Cert_{REQ}$.

S105, the AAC verifies, using the public key of the AS-AAC, the $Sig_{AS\_AAC}$.

After verification is successful, subsequent operation is executed.

S106, the AAC determines an identity authentication result of the REQ according to the $Res_{REQ}$ in the $Pub_{REQ}$.

Since the $Res_{REQ}$ may reflect whether the REQ is legal, after verification for the $Sig_{AS\_AAC}$ by the AAC is successful, the AAC may determine whether the REQ is legal according to the $Res_{REQ}$ in the $Pub_{REQ}$, so as to ensure that only legal REQs can access the network.

From the above technical solution, it can be seen that when identity information is transmitted between the REQuester and the authentication access controller, confidential processing is performed on the identity information of the REQuester, exposure of the identity information in the transmission process is prevented, and it is ensured that private and sensitive information cannot be obtained by an attacker. In addition, by involving the authentication server, while ensuring the confidentiality of the entity identity related information, real-time authentication of one-way identity authentication for the REQuester by the authentication access controller is realized, and a foundation is laid for ensuring that only legal users can access the network.

Please refer to FIG. 1, in some embodiments, the REQInit in S101 may further include a digital signature $Sig_{REQ}$ of the REQ, the to-be-signed data of the $Sig_{REQ}$ includes other fields before the $Sig_{REQ}$ in the REQInit, then before S106, the AAC further needs to determine whether verification for the $Sig_{REQ}$ is successful, and S106 can be executed only when verification is successful. The AAC determines whether verification for the $Sig_{REQ}$ is successful through the following modes: (1) the AAC may verify, using the $Cert_{REQ}$ obtained by decrypting the $EncData_{REQ}$ in the REQInit, the $Sig_{REQ}$, and determine whether verification for the $Sig_{REQ}$ is successful according to the verification result; (2) when the $Pub_{REQ}$ in the ASVeri in S104 further includes the $Cert_{REQ}$, the AAC may verify, using the $Cert_{REQ}$ in the $Pub_{REQ}$, the $Sig_{REQ}$, and determine whether verification for the $Sig_{REQ}$ is successful according to the verification result; (3) when the $Pub_{REQ}$ in the ASVeri in S104 further includes the $Cert_{REQ}$, the AAC may compare consistency between the $Cert_{REQ}$ in the $Pub_{REQ}$ and the $Cert_{REQ}$ obtained by decrypting the $EncData_{REQ}$ firstly, if consistent, the AAC then verifies, using the $Cert_{REQ}$ in the $Pub_{REQ}$, the $Sig_{REQ}$, and determines whether verification for the $Sig_{REQ}$ is successful according to the verification result; and (4) the $Sig_{REQ}$ may also be verified by the AS-REQ trusted by the REQ, in this case, the $Sig_{REQ}$ may be carried in the AACVeri in S103, the AS-AAC further transmits the $Sig_{REQ}$ to the AS-REQ through the AS-AACVeri, the AS-REQ verifies, using the received $Cert_{REQ}$, the $Sig_{REQ}$, after verification is successful, the subsequent flow may be executed, and therefore, if the AAC can receive the ASVeri in S104, the AAC may determine that verification for the $Sig_{REQ}$ has been successful.

In the process of identity authentication, the consistency of an identity identifier and/or a random number in the message may further be verified, so as to ensure the reliability and freshness of the authentication result. Please refer to FIG. 1, in some embodiments, the AACVeri in S103 may further include an identity identifier $ID_{AAC}$ of the AAC and/or a first random number $Nonce_{AAC}$ generated by the AAC; and correspondingly, the ASVeri in S104 further includes the $ID_{AAC}$ and/or the $Nonce_{AAC}$.

It needs to be illustrated that, after the AS-AAC receives the AACVeri, the AS-AAC may transmit the $ID_{AAC}$ and/or the $Nonce_{AAC}$ in a subsequent interactive message, for example, the AS-AAC transmits the $ID_{AAC}$ and/or the $Nonce_{AAC}$ to the AAC through the ASVeri. Under normal circumstances, the $ID_{AAC}$ and/or the $Nonce_{AAC}$ in the ASVeri should be the same as the $ID_{AAC}$ and/or the $Nonce_{AAC}$ in the AACVeri, however, in the transmission process of the AACVeri and/or the ASVeri, if network jitter or attacks are encountered, loss or tampering of parameter information in the message may be caused. Therefore, before S106, the AAC may verify consistency between the $ID_{AAC}$ in the ASVeri and an own identity identifier $ID_{AAC}$ of the AAC firstly, and/or, verify consistency between the $Nonce_{AAC}$ in the ASVeri and the $Nonce_{AAC}$ generated by the AAC, and if verification is successful, the AAC then executes S106 to determine the identity authentication result of the REQ according to the $Res_{REQ}$ in the $Pub_{REQ}$.

Figure 2:
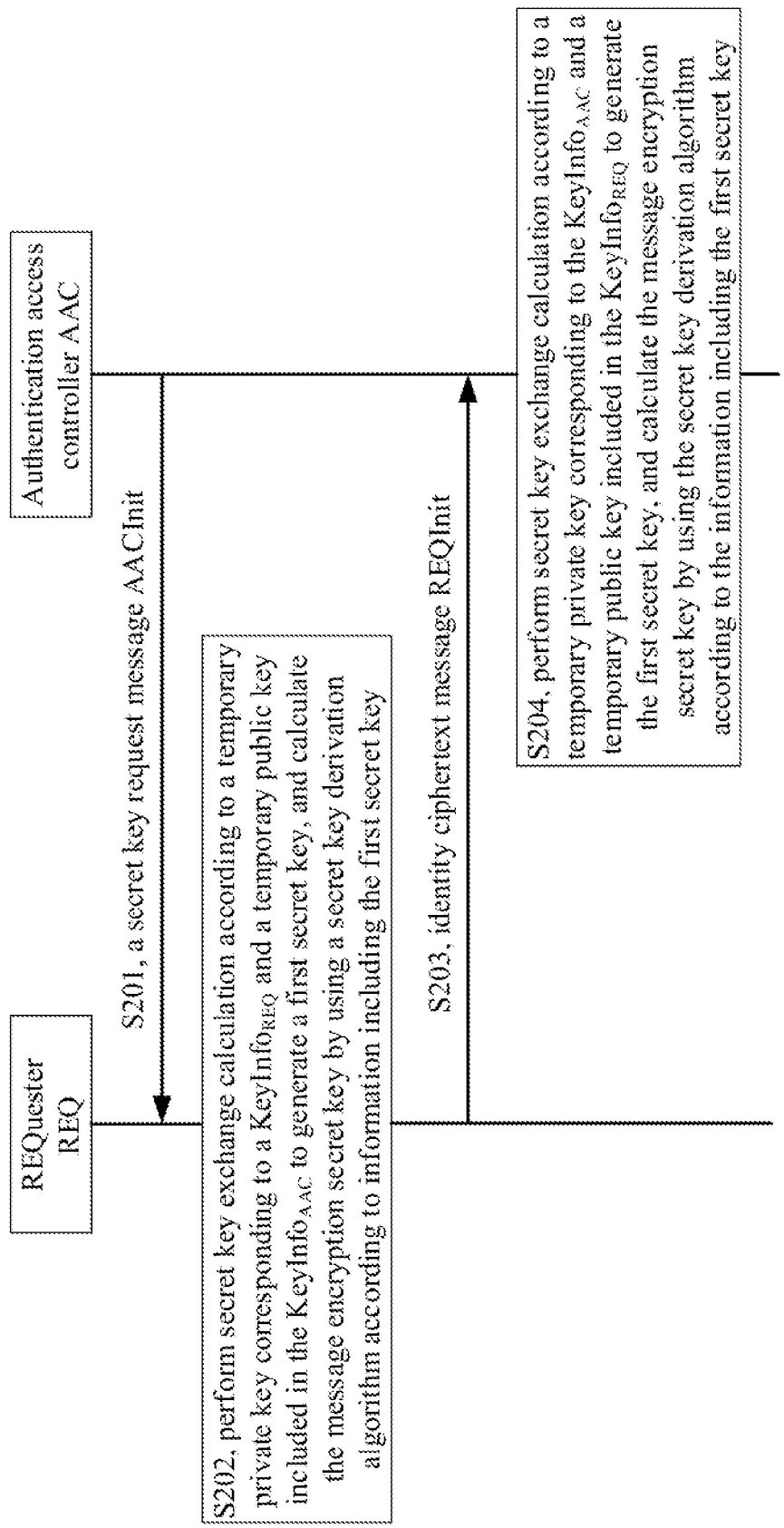
FIG. 2 is a schematic diagram of a method for a REQuester REQ and an authentication access controller AAC to negotiate a message encryption secret key provided by an embodiment of the present application.

In the above embodiments, the message encryption secret key used by the REQ and the AAC may be obtained by negotiation of the two. Therefore, the embodiment further provides a method for negotiating the message encryption secret key between the REQ and the AAC, and referring to FIG. 2, the method includes the following.

S201, the AAC transmits a secret key request message AACInit to the REQ.

The AACInit includes a secret key exchange parameter $KeyInfo_{AAC}$ of the AAC, the $KeyInfo_{AAC}$ includes a temporary public key of the AAC, where the secret key exchange refers to secret key exchange algorithms such as Diffie-Hellman (DH). The AACInit may further include a first random number $Nonce_{AAC}$ generated by the AAC.

The AACInit may further include Security capabilities$_{AAC}$, the Security capabilities$_{AAC}$ represents security capability parameter information supported by the AAC, including an identity authentication suite (which contains one or more methods for identity authentication), one or more symmetric encryption algorithms and/or one or more secret key derivation algorithms, for a specific security strategy to be selected and used by the REQ, and then the REQ may select the specific security strategy Security capabilities$_{REQ}$ used by the REQ according to the Security capabilities$_{AAC}$. The Security capabilities$_{REQ}$ represents a method for identity authentication, a symmetric encryption algorithm and/or a secret key derivation algorithm that the REQ determines to use accordingly.

S202, the REQ performs secret key exchange calculation according to a temporary private key corresponding to a secret key exchange parameter $KeyInfo_{REQ}$ of the REQ and a temporary public key included in the $KeyInfo_{AAC}$ to generate a first secret key, and calculates a message encryption secret key by using the secret key derivation algorithm according to information including the first secret key.

If the AACInit in S201 further includes the $Nonce_{AAC}$ generated by the AAC, the REQ may perform secret key exchange calculation according to the temporary private key corresponding to the $KeyInfo_{REQ}$ and the temporary public key included in the $KeyInfo_{AAC}$ to generate the first secret key K1, combine the K1 with a second random number $Nonce_{REQ}$ generated by the REQ and information including the $Nonce_{AAC}$, and calculate the message encryption secret key by using the negotiated or preset secret key derivation algorithm. The negotiated secret key derivation algorithm may be a secret key derivation key derivation algorithm selected and used by the REQ according to the Security capabilities$_{AAC}$ transmitted by the AAC. The $KeyInfo_{REQ}$ is the secret key exchange parameter generated by the REQ, and includes the temporary public key of the REQ. The temporary private key corresponding to the $KeyInfo_{REQ}$ is a temporary private key generated by the REQ and corresponding to the temporary public key of the REQ, that is, the temporary public key and the temporary private key are a temporary public and private key pair.

S203, the REQ transmits an identity ciphertext message REQInit to the AAC.

The REQInit includes the $KeyInfo_{REQ}$, so that the AAC calculates the message encryption secret key according to the information including the temporary private key corresponding to the $KeyInfo_{AAC}$ and the temporary public key included in the $KeyInfo_{REQ}$. The temporary private key corresponding to the $KeyInfo_{AAC}$ is a temporary private key generated by the AAC and corresponding to the temporary public key of the AAC, that is, the temporary public key and the temporary private key are a temporary public and private key pair.

The REQInit may further include the Security capabilities$_{REQ}$. The REQInit may further include the Nonce$_{REQ}$, so that the AAC calculates the message encryption secret key according to information including the temporary private key corresponding to the KeyInfo$_{AAC}$, the temporary public key included in the KeyInfo$_{REQ}$, Nonce$_{AAC}$ and the Nonce$_{REQ}$.

The REQInit may further include the Nonce$_{AAC}$, then before the AAC calculates the message encryption secret key, the AAC may verify consistency between the Nonce$_{AAC}$ in the REQInit and the Nonce$_{AAC}$ generated by the AAC, so as to ensure that the REQInit received by the AAC is a response message for the AACInit.

S204, the AAC performs secret key exchange calculation according to a temporary private key corresponding to the KeyInfo$_{AAC}$ and a temporary public key included in the KeyInfo$_{REQ}$ to generate a first secret key, and calculates the message encryption secret key by using the secret key derivation algorithm according to the information including the first secret key.

If the REQInit further includes the Nonce$_{REQ}$, the AAC may perform secret key exchange calculation according to the temporary private key corresponding to the KeyInfo$_{AAC}$ and the temporary public key included in the KeyInfo$_{REQ}$ to generate the first secret key K1, combine the K1 with information including the Nonce$_{AAC}$ and the Nonce$_{REQ}$, and calculate the message encryption secret key by using the negotiated or preset secret key derivation algorithm. The negotiated secret key derivation algorithm may be a secret key derivation algorithm selected and used by the AAC according to the Security capabilities$_{REQ}$ transmitted by the REQ.

The embodiment of the present application further provides a method for determining the first authentication server and/or the second authentication server used in the authentication process by using information interaction between the AAC and the REQ. The AAC adds the identity identifier ID$_{AS\_AAC}$ of at least one authentication server trusted by the AAC into the AACInit in S201, and then the REQ determines the identity identifier of at least one authentication server trusted by the REQ according to the ID$_{AS\_AAC}$. During specific implementation, the REQ selects at least one authentication server that is trusted by the REQ from the ID$_{AS\_AAC}$ as the ID$_{AS\_REQ}$, if selection fails, the REQ takes the at least one authentication server that is trusted by itself as the ID$_{AS\_REQ}$ (successful selection corresponds to a non-roaming situation, and failed selection corresponds to a roaming situation), and adds the ID$_{AS\_REQ}$ into the REQInit in S203 to transmit to the AAC. Then, the AAC may determine the first authentication server according to the ID$_{AS\_AAC}$ and the ID$_{AS\_REQ}$, for example, the AAC may determine whether there is an identity identifier of at least one same authentication server between the ID$_{AS\_REQ}$ and the ID$_{AS\_AAC}$, if yes, it is the non-roaming situation, and the AAC determines the first authentication server participating in identity authentication from the above at least one authentication server that is jointly trusted by the REQ and the AAC; and if not, it is the roaming situation, the AAC needs to determine the first authentication server AS-AAC participating in identity authentication according to the ID$_{AS\_AAC}$, and transmits the ID$_{AS\_REQ}$ to the AS-AAC, so that the AS-AAC determines the second authentication server AS-REQ according to the ID$_{AS\_REQ}$.

As another implementation, the AAC may not need to transmit the ID$_{AS\_AAC}$ to the REQ, while the REQ adds the identity identifier ID$_{AS\_REQ}$ of the at least one authentication server that is trusted by the REQ into the REQInit in S203. The first authentication server and/or the second authentication server participating in the process of identity authentication are/is determined according to the ID$_{AS\_REQ}$ and the identity identifier ID$_{AS\_AAC}$ of the authentication server that is trusted by the AAC itself, and a specific implementation is as the previous implementation.

Since the authentication servers that are trusted by the REQ and the AAC may be the same or different, and when the authentication servers that are trusted by the REQ and the AAC are the same, it is the non-roaming situation; and when the authentication servers that are trusted by the REQ and the AAC are different, it is the roaming situation.

Figure 3:
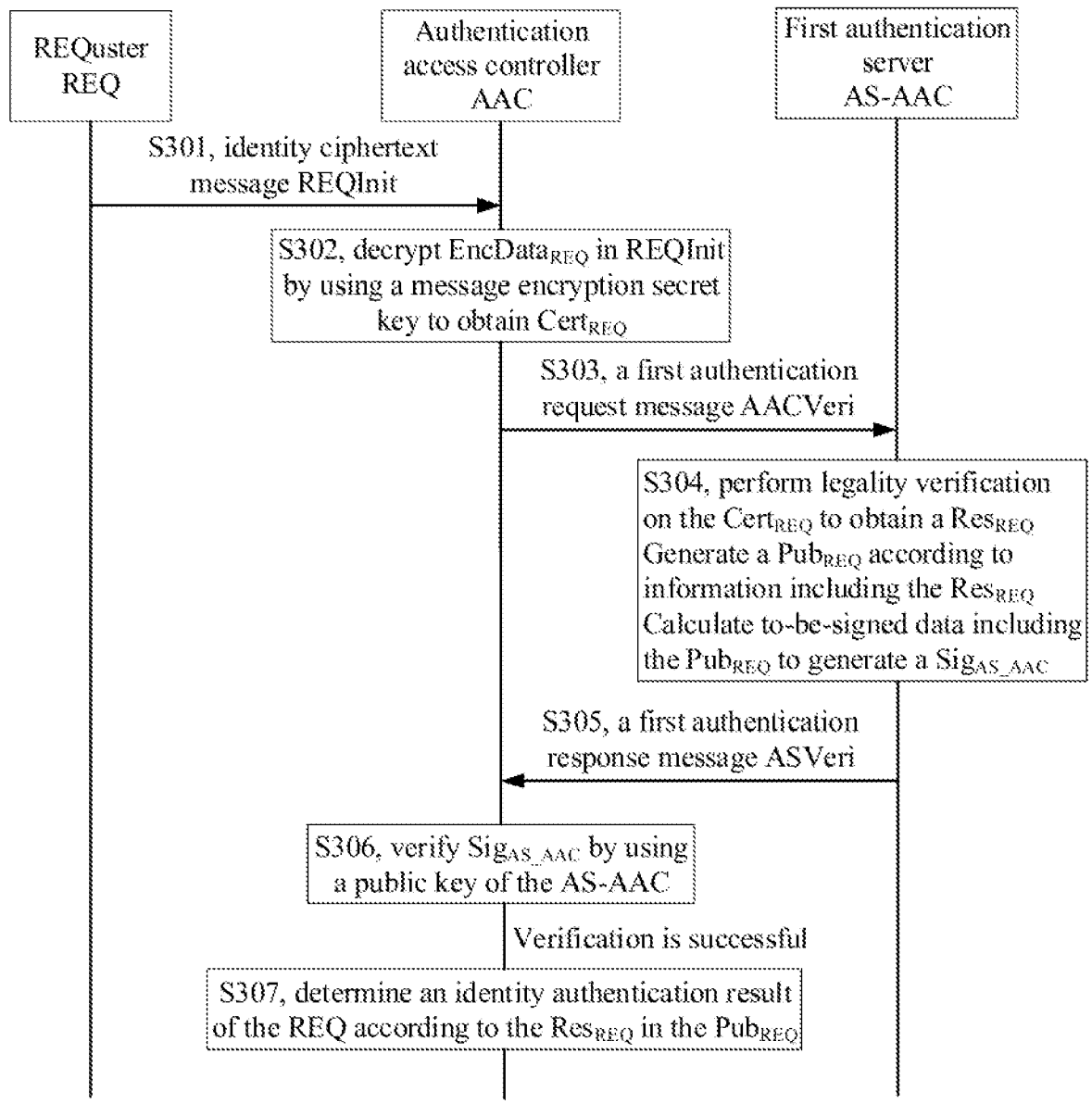
FIG. 3 is a schematic diagram of a method for identity authentication in a non-roaming situation provided by an embodiment of the present application.

Referring to FIG. 3, it is an embodiment of a method for identity authentication in a non-roaming situation. The AS-AAC (of course, or AS-REQ) may be used to represent the authentication server jointly trusted by the REQ and the AAC, before the embodiment is executed, the REQ and the AAC both have the message encryption secret key, and the message encryption secret key may be pre-shared by both parties, or negotiated by both parties through the method shown in FIG. 2 in advance. The method for identity authentication includes the following.

S301, the AAC acquires an identity ciphertext message REQInit transmitted by the REQ.

The REQInit includes identity information ciphertext EncData$_{REQ}$ of the REQ.

S302, the AAC decrypts the EncData$_{REQ}$ in the REQInit by using the message encryption secret key to obtain a Cert$_{REQ}$.

S303, the AAC transmits a first authentication request message AACVeri to the AS-AAC.

The AACVeri includes the Cert$_{REQ}$.

S304, the AS-AAC performs legality verification on the Cert$_{REQ}$ to obtain a Res$_{REQ}$, generates a Pub$_{REQ}$ according to information including the Res$_{REQ}$, and calculates to-be-signed data including the Pub$_{REQ}$ to generate a digital signature Sig$_{AS\_AAC}$ of the AS-AAC.

S305, the AAC receives the first authentication response message ASVeri transmitted by the AS-AAC.

The ASVeri includes the Pub REQ and the Sig$_{AS\_AAC}$.

S306, the AAC verifies the Sig$_{AS\_AAC}$ by using a public key of the AS-AAC.

If verification is successful, S307 is executed.

S307, the AAC determines an identity authentication result of the REQ according to the Res$_{REQ}$ in the Pub$_{REQ}$.

Figure 4:
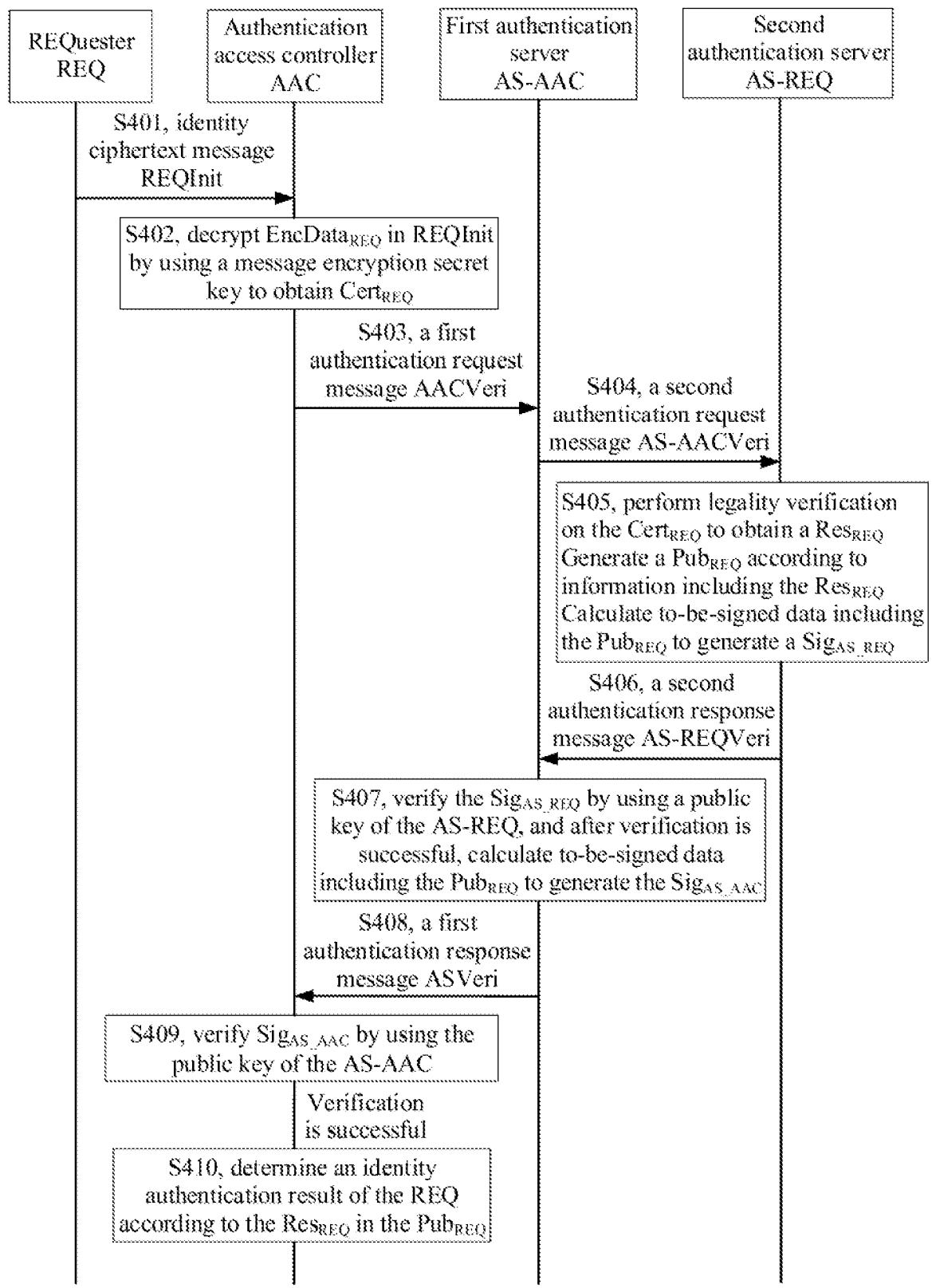
FIG. 4 is a schematic diagram of a method for identity authentication in a roaming situation provided by an embodiment of the present application.

Referring to FIG. 4, it is an embodiment of a method for identity authentication in a roaming situation. The AS-AAC and the AS-REQ are trusted by each other and know each other's digital certificates or the public keys in the digital certificates, before the embodiment is executed, the REQ and the AAC both have the message encryption secret key, and the message encryption secret key may be pre-shared by both parties, or negotiated by both parties through the method shown in FIG. 2 in advance. The method for identity authentication includes the following.

S401, the AAC acquires an identity ciphertext message REQInit transmitted by the REQ.

The REQInit includes identity information ciphertext EncData$_{REQ}$ of the REQ.

S402, the AAC decrypts the EncData$_{REQ}$ in the REQInit by using the message encryption secret key to obtain a Cert$_{REQ}$.

S403, the AAC transmits a first authentication request message AACVeri to the AS-AAC.

The AACVeri includes the $Cert_{REQ}$.

S404, the AS-AAC transmits a second authentication request message AS-AACVeri to the AS-REQ.

Since the AS-AAC is not the authentication server trusted by the REQ, the AS-AAC cannot perform legality verification on the $Cert_{REQ}$, and thus, it is necessary to add the $Cert_{REQ}$ into the AS-AACVeri to be transmitted to the AS-REQ trusted by the REQ for legality verification.

S405, the AS-REQ performs legality verification on the $Cert_{REQ}$ to obtain a $Res_{REQ}$, generates a $Pub_{REQ}$ according to information including the $Res_{REQ}$, and calculates to-be-signed data including the $Pub_{REQ}$ to generate a digital signature $Sig_{AS\_REQ}$ of the AS-REQ.

S406, the AS-AAC receives a second authentication response message AS-REQVeri transmitted by the AS-REQ.

The AS-REQVeri includes the Pub REQ and the $Sig_{AS\_REQ}$.

S407, the AS-AAC verifies the $Sig_{AS\_REQ}$ by using a public key of the AS-REQ, and after verification is successful, calculates to-be-signed data including the $Pub_{REQ}$ to generate the digital signature $Sig_{AS\_AAC}$ of the AS-AAC.

S408, the AAC receives the first authentication response message ASVeri transmitted by the AS-AAC.

The ASVeri includes the Pub REQ and the $Sig_{AS\_AAC}$.

S409, the AAC verifies the $Sig_{AS\_AAC}$ by using a public key of the AS-AAC.

If verification is successful, S410 is executed.

S410, the AAC determines an identity authentication result of the REQ according to the $Res_{REQ}$ in the $Pub_{REQ}$.

Figure 5:
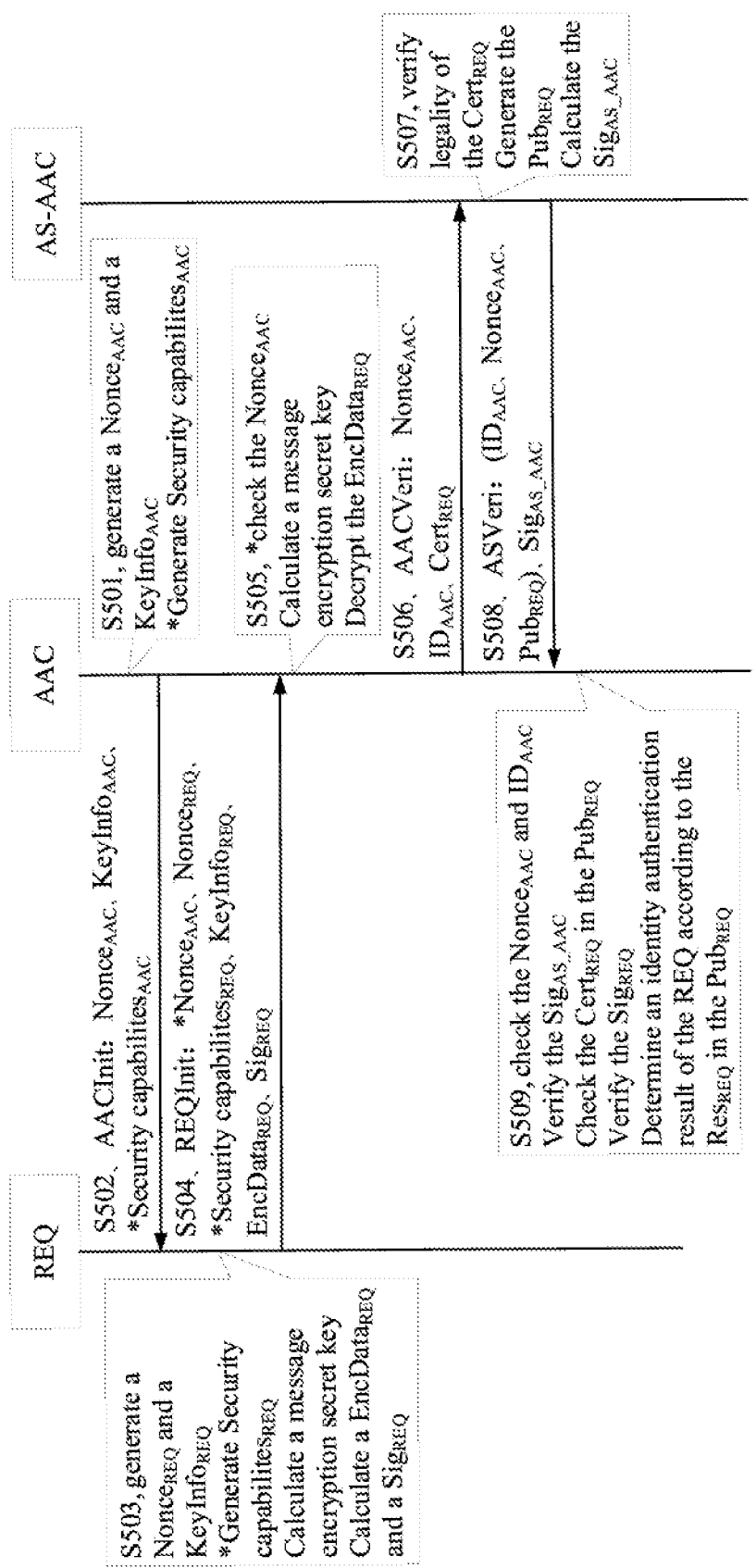
FIG. 5 is a schematic diagram of another method for identity authentication in a non-roaming situation provided by an embodiment of the present application, where, "*" represents an optional field or optional operation.

Referring to FIG. 5, it is an embodiment of a method for identity authentication in a non-roaming situation. The AS-AAC (of course, or AS-REQ) may be used to represent the authentication server jointly trusted by the REQ and the AAC, in the embodiment, a negotiation process of the message encryption secret key between the REQ and the AAC is integrated into the identity authentication process, which more facilitates engineering implementation. The method for identity authentication includes the following.

S501, the AAC generates a $Nonce_{AAC}$ and a $KeyInfo_{AAC}$, and generates Security capabilities$_{AAC}$ according to needs.

S502, the AAC transmits a secret key request message AACInit to the REQ.

The AACInit includes the $Nonce_{AAC}$, the $KeyInfo_{AAC}$ and the Security capabilities$_{AAC}$. The Security capabilities$_{AAC}$ is an optional field, which represents security capability parameter information supported by the AAC, including an identity authentication suite, one or more symmetric encryption algorithms and/or one or more secret key derivation algorithms (identical in full text) supported by the AAC.

S503, the REQ generates a $Nonce_{REQ}$ and a $KeyInfo_{REQ}$, generates Security capabilities$_{REQ}$ according to needs, performs secret key exchange calculation according to a temporary private key corresponding to the $KeyInfo_{REQ}$ and a temporary public key included in the $KeyInfo_{AAC}$ to generate a first secret key K1, combines the K1 with the $Nonce_{AAC}$, the $Nonce_{REQ}$ and other information (the other information, such as a specific character string, adopted by the REQ and the AAC is the same and optional), calculates the message encryption secret key by using a negotiated or preset secret key derivation algorithm, calculates identity information ciphertext $EncData_{REQ}$ of the REQ by using the message encryption secret key and adopting a symmetric encryption algorithm, and calculates the $Sig_{REQ}$.

The Security capabilities$_{REQ}$ represents the selection for a specific security strategy made by the REQ according to the Security capabilities$_{AAC}$, namely the method for identity authentication, a symmetric encryption algorithm and/or a secret key derivation algorithm that the REQ determines to use (identical in full text).

S504, the REQ transmits an identity ciphertext message REQInit to the AAC.

The REQInit includes the $Nonce_{AAC}$, the $Nonce_{REQ}$, the Security capabilities$_{REQ}$, the $KeyInfo_{REQ}$, the $EncData_{REQ}$ and the $Sig_{REQ}$. The $Nonce_{AAC}$ is an optional field, which should be equal to the $Nonce_{AAC}$ in the AACInit; and the Security capabilities$_{REQ}$ is an optional field, and exists only when the Security capabilities$_{AAC}$ in the AACInit exists. Encryption data of the $EncData_{REQ}$ includes a $Cert_{REQ}$. To-be-signed data of the $Sig_{REQ}$ includes other fields before the $Sig_{REQ}$ in the REQInit, for example, when the REQInit sequentially includes the $Nonce_{AAC}$, the $Nonce_{REQ}$, the Security capabilities$_{REQ}$, the $KeyInfo_{REQ}$, the $EncData_{REQ}$ and the $Sig_{REQ}$, the to-be-signed data of the $Sig_{REQ}$ includes the $Nonce_{AAC}$, the $Nonce_{REQ}$, the Security capabilities$_{REQ}$, the $KeyInfo_{REQ}$ and the $EncData_{REQ}$. In addition, when the REQInit does not include the $Nonce_{AAC}$ field, the to-be-signed data of the $Sig_{REQ}$ further should include the $Nonce_{AAC}$ field in the AACInit. In the present application, an encrypted object is called the encryption data, and a signed object is called the to-be-signed data.

S505, after the AAC receives the REQInit, the AAC executes the following operations (unless otherwise specified or logically related, actions numbered as (1), (2) . . . herein do not necessarily have a sequential order due to their numbering, which is identical in full text), including: (1), if there is the $Nonce_{AAC}$ in the REQInit, checking whether the $Nonce_{AAC}$ in the REQInit is the same as the $Nonce_{AAC}$ generated by the AAC, and if not, abandoning the REQInit; (2), performing secret key exchange calculation according to the temporary private key corresponding to the $KeyInfo_{AAC}$ and the temporary public key included in the $KeyInfo_{REQ}$ to generate the first secret key K1, combining the K1 with the $Nonce_{AAC}$, the $Nonce_{REQ}$ and other information (the other information, such as a specific character string, adopted by the REQ and the AAC is the same and optional), and calculating the message encryption secret key by using the negotiated or preset secret key derivation algorithm; and (3), decrypting the $EncData_{REQ}$ by using the message encryption secret key and adopting the symmetric encryption algorithm to obtain the $Cert_{REQ}$.

S506, the AAC transmits a first authentication request message AACVeri to the AS-AAC.

The AACVeri includes the $Nonce_{AAC}$, an $ID_{AAC}$ and the $Cert_{REQ}$. The $Nonce_{AAC}$ should be equal to the $Nonce_{AAC}$ generated by the AAC; and the $Cert_{REQ}$ should be equal to the $Cert_{REQ}$ in the REQInit.

S507, after the AS-AAC receives the AACVeri, the AS-AAC executes the following operations, including: (1), verifying legality of the $Cert_{REQ}$ to obtain a $Res_{REQ}$, and generating a $Pub_{REQ}$ according to information including the $Cert_{REQ}$ and the $Res_{REQ}$; and (2), calculating the $Sig_{AS\_AAC}$.

S508, the AS-AAC transmits a first authentication response message ASVeri to the AAC.

The ASVeri includes the $ID_{AAC}$, the $Nonce_{AAC}$, the $Pub_{REQ}$ and the $Sig_{AS\_AAC}$. The $ID_{AAC}$ and the $Nonce_{AAC}$ should be equal to corresponding fields in the AACVeri respectively; and the to-be-signed data of the $Sig_{AS\_AAC}$ includes the $ID_{AAC}$, the $Nonce_{AAC}$ and the $Pub_{REQ}$.

S509, after the AAC receives the ASVeri, the AAC executes the following operations, including: (1), checking whether the $ID_{AAC}$ and the $Nonce_{AAC}$ in the ASVeri are the same as an own identity identifier $ID_{AAC}$ of the AAC and the Nonce$_{AAC}$ generated by the AAC respectively; (2), verifying the Sig$_{AS\_AAC}$ by using a public key of the AS-AAC; (3), checking whether the Cert$_{REQ}$ in the Pub$_{REQ}$ is the same as the Cert$_{REQ}$ obtained by decrypting the EncData$_{REQ}$; (4), verifying the Sig$_{REQ}$ by using the Cert$_{REQ}$; (5), after all checks and verifications are successful, determining an identity authentication result of the REQ according to the Res$_{REQ}$ in the Pub$_{REQ}$; and if any of the above checks and verifications fails, immediately abandoning the ASVeri.

It needs to be illustrated that, in S509, verification for the Sig$_{REQ}$ may be changed to be executed in S505 firstly, that is, after the AAC decrypts the EncData$_{REQ}$ to obtain the Cert$_{REQ}$, the AAC verifies the Sig$_{REQ}$ by using the Cert$_{REQ}$, and at this time, the Pub$_{REQ}$ may not include the Cert$_{REQ}$. Alternatively, in S509, verification for the Sig$_{REQ}$ may also be changed to be executed in S507 by the AS-AAC firstly, in this case, the Sig$_{REQ}$ is transmitted to the AS-AAC through the AACVeri in S506, the AS-AAC verifies the Sig$_{REQ}$ by using the received Cert$_{REQ}$, and at this time, the Pub$_{REQ}$ may not include the Cert$_{REQ}$.

Figure 6:
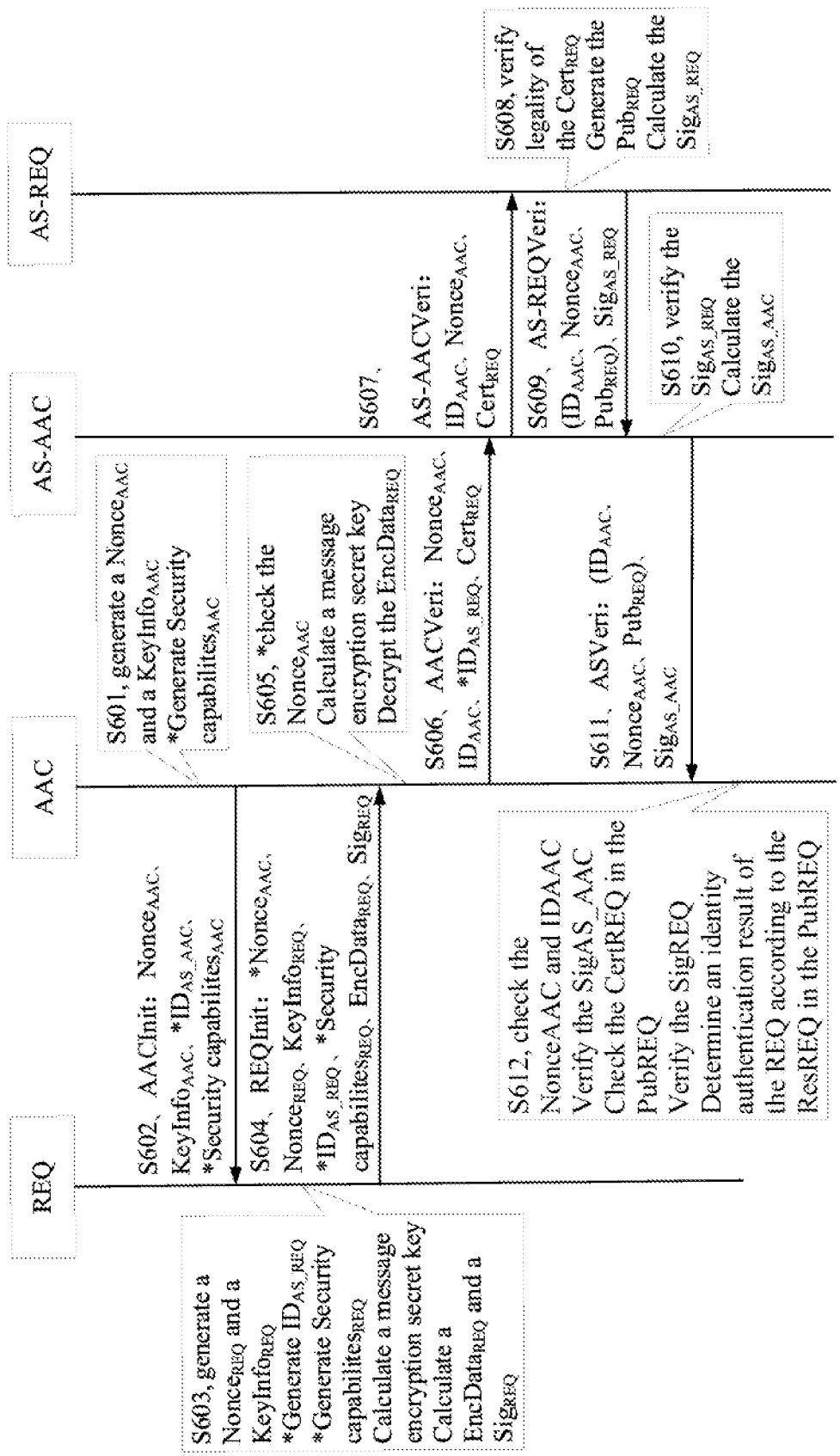
FIG. 6 is a schematic diagram of another method for identity authentication in a roaming situation provided by an embodiment of the present application, where, "*" represents an optional field or optional operation.

Referring to FIG. 6, it is an embodiment of a method for identity authentication in a roaming situation. In the embodiment, a negotiation process of the message encryption secret key between the REQ and the AAC is integrated into the identity authentication process, which more facilitates engineering implementation. The method for identity authentication includes the following.

S601, the AAC generates a Nonce$_{AAC}$ and a KeyInfo$_{AAC}$, and generates Security capabilities$_{AAC}$ according to needs.

S602, the AAC transmits a secret key request message AACInit to the REQ.

The AACInit includes the Nonce$_{AAC}$, the KeyInfo$_{AAC}$, the ID$_{AS\_AAC}$ and the Security capabilities$_{AAC}$. The ID$_{AS\_AAC}$ and the Security capabilities$_{AAC}$ are optional fields; and the ID$_{AS\_AAC}$ represents the identity identifier of at least one authentication server trusted by the AAC, which is used for enabling the REQ to determine whether there is a jointly trusted authentication server according to the ID$_{AS\_AAC}$.

S603, the REQ generates a Nonce$_{REQ}$ and a KeyInfo$_{REQ}$, generates an ID$_{AS\_REQ}$ and Security capabilities$_{REQ}$ according to needs, performs secret key exchange calculation according to a temporary private key corresponding to the KeyInfo$_{REQ}$ and a temporary public key included in the KeyInfo$_{AAC}$ to generate a first secret key K1, combines the K1 with the Nonce$_{AAC}$, the Nonce$_{REQ}$ and other information (the other information, such as a specific character string, adopted by the REQ and the AAC is the same and optional), calculates the message encryption secret key by using the negotiated or preset secret key derivation algorithm, calculates identity information ciphertext EncData$_{REQ}$ of the REQ by using the message encryption secret key and adopting the symmetric encryption algorithm, and calculates the Sig$_{REQ}$.

The Security capabilities$_{REQ}$ and the ID$_{AS\_REQ}$ are optional fields; the ID$_{AS\_REQ}$ represents the identity identifier of at least one authentication server trusted by the REQ, when there is the ID$_{AS\_AAC}$ in the AACInit, the REQ tries to select at least one authentication server which is the same as the ID$_{AS\_AAC}$ from the authentication servers trusted by itself as the ID$_{AS\_REQ}$, if selection fails, at least one authentication server trusted by itself is used as the ID$_{AS\_REQ}$ (a case of selection failure in the embodiment); and when there is no ID$_{AS\_AAC}$ in the AACInit, the REQ uses at least one authentication server trusted by itself as the ID$_{AS\_REQ}$.

S604, the REQ transmits an identity ciphertext message REQInit to the AAC.

The REQInit includes the Nonce$_{AAC}$, the Nonce$_{REQ}$, the KeyInfo$_{REQ}$, the ID$_{AS\_REQ}$, the Security capabilities$_{REQ}$, the EncData$_{REQ}$ and the Sig$_{REQ}$. The Nonce$_{AAC}$, the Security capabilities$_{REQ}$ and the ID$_{AS\_REQ}$ are optional fields, and the Nonce$_{AAC}$ should be equal to a corresponding field in the AACInit; and encryption data of the EncData$_{REQ}$ includes a Cert$_{REQ}$. To-be-signed data of the Sig$_{REQ}$ includes other fields before the Sig$_{REQ}$ in the REQInit, and when the REQInit does not include the Nonce$_{AAC}$, the to-be-signed data of the Sig$_{REQ}$ further includes the Nonce$_{AAC}$ field in the AACInit.

S605, after the AAC receives the REQInit, the AAC executes the following operations, including: (1), if there is the Nonce$_{AAC}$ in the REQInit, checking whether the Nonce$_{AAC}$ is the same as the Nonce$_{AAC}$ generated by the AAC, and if not, abandoning the REQInit; (2), performing secret key exchange calculation1 according to the temporary private key corresponding to the KeyInfo$_{AAC}$ and the temporary public key included in the KeyInfo$_{REQ}$ to generate the first secret key K, combining the K1 with the Nonce$_{AAC}$, the Nonce$_{REQ}$ and other information (the other information adopted by the REQ and the AAC is the same and optional, such as a specific character string), and calculating the message encryption secret key by using the negotiated or preset secret key derivation algorithm; (3), decrypting the EncData$_{REQ}$ by using the message encryption secret key and adopting the symmetric encryption algorithm to obtain the Cert$_{REQ}$; (4), if the REQInit carries the ID$_{AS\_REQ}$, and the AACInit carries the ID$_{AS\_AAC}$, judging, by the AAC, whether there is the identity identifier of at least one same authentication server between the ID$_{AS\_REQ}$ and the ID$_{AS\_AAC}$, if yes, it is the non-roaming situation, and determining, by the AAC, the first authentication server participating in identity authentication from the above at least one authentication server that is jointly trusted by the REQ and the AAC; and if not, it is the roaming situation, the AAC needing to determine the first authentication server AS-AAC participating in identity authentication according to the ID$_{AS\_AAC}$, and transmit the ID$_{AS\_REQ}$ to the AS-AAC, so that the AS-AAC determines the second authentication server AS-REQ according to the ID$_{AS\_REQ}$; or if the REQInit carries the ID$_{AS\_REQ}$, but the AACInit does not carry the ID$_{AS\_AAC}$, judging, by the AAC, whether there is the identity identifier of at least one same authentication server in the authentication server trusted by the ID$_{AS\_REQ}$ and the AAC, if yes, it is the non-roaming situation, and determining, by the AAC, the first authentication server participating in identity authentication from the above at least one authentication server that is jointly trusted by the REQ and the AAC; and if not, it is the roaming situation, the AAC needing to determine the first authentication server AS-AAC participating in identity authentication according to the authentication server trusted by itself, and transmit the ID$_{AS\_REQ}$ to the AS-AAC, so that the AS-AAC determines the second authentication server AS-REQ according to the ID$_{AS\_REQ}$.

It needs to be illustrated that the result judged by the embodiment is the roaming situation.

S606, the AAC transmits a first authentication request message AACVeri to the AS-AAC.

The AACVeri includes the Nonce$_{AAC}$, the ID$_{AAC}$, the ID$_{AS\_REQ}$ and the Cert$_{REQ}$. The ID$_{AS\_REQ}$ is an optional field, which should be equal to a corresponding field in the REQInit; the Nonce$_{AAC}$ should be equal to the Nonce$_{AAC}$ generated by the AAC; and the Cert$_{REQ}$ should be equal to a corresponding field in the REQInit.

S607, after the AS-AAC receives the AACVeri, the AS-AAC transmits a second authentication request message AS-AACVeri to the AS-REQ.

If there is the $ID_{AS\_REQ}$ in the AACVeri, the AS-AAC determines the second authentication server AS-REQ according to the $ID_{AS\_REQ}$; and if not, it represents that the AS-AAC has known the AS-REQ. The AS-AACVeri includes the $ID_{AAC}$, the $Nonce_{AAC}$ and the $Cert_{REQ}$. The $ID_{AAC}$, the $Nonce_{AAC}$ and the $Cert_{REQ}$ all come from the AACVeri.

S608, after AS-REQ receives the AS-AACVeri, the AS-REQ executes the following operation, including: (1), verifying legality of the $Cert_{REQ}$ to obtain a $Res_{REQ}$, and generating a $Pub_{REQ}$ according to information including the $Cert_{REQ}$ and the $Res_{REQ}$; and (2), calculating the $Sig_{AS\_REQ}$.

S609, the AS-REQ transmits the second authentication response message AS-REQVeri to the AS-AAC.

The AS-REQVeri includes the $ID_{AAC}$, the $Nonce_{AAC}$, the $Pub_{REQ}$ and the $Sig_{AS\_REQ}$. The $ID_{AAC}$ and the $Nonce_{AAC}$ should be equal to corresponding fields in the AS-AACVeri respectively; and the to-be-signed data of the $Sig_{AS\_REQ}$ includes the $ID_{AAC}$, the $Nonce_{AAC}$ and the $Pub_{REQ}$.

S610, after the AS-AAC receives the AS-REQVeri, the AS-AAC executes the following operation, including: (1), verifying the $Sig_{AS\_REQ}$ by using a public key of the AS-REQ, and if verification for the $Sig_{AS\_REQ}$ fails, abandoning the AS-REQVeri; and (2), calculating the $Sig_{AS\_AAC}$.

S611, the AS-AAC transmits a first authentication response message ASVeri to the AAC.

The ASVeri includes the $ID_{AAC}$, the $Nonce_{AAC}$, the $Pub_{REQ}$ and the $Sig_{AS\_AAC}$. The $ID_{AAC}$, the $Nonce_{AAC}$ and the $Pub_{REQ}$ should be equal to corresponding fields in the AS-REQVeri respectively; and the to-be-signed data of the $Sig_{AS\_AAC}$ includes the $ID_{AAC}$, the $Nonce_{AAC}$ and the $Pub_{REQ}$.

S612, after the AAC receives the ASVeri, the AAC executes the following operations, including: (1), checking whether the $ID_{AAC}$ and the $Nonce_{AAC}$ in the ASVeri are the same as an own identity identifier $ID_{AAC}$ of the AAC and the $Nonce_{AAC}$ generated by the AAC respectively; (2), verifying the $Sig_{AS\_AAC}$ by using a public key of the AS-AAC; (3), checking whether the $Cert_{REQ}$ in the $Pub_{REQ}$ is the same as the $Cert_{REQ}$ obtained by decrypting the $EncData_{REQ}$; (4), verifying the $Sig_{REQ}$ by using the $Cert_{REQ}$; and (5), after all checks and verifications are successful, determining an identity authentication result of the REQ according to the $Res_{REQ}$ in the $Pub_{REQ}$; and if any of the above checks and verifications fails, immediately abandoning the ASVeri.

It needs to be illustrated that, in S612, verification for the $Sig_{REQ}$ may be changed to be executed in S605 firstly, that is, after decrypting the $EncData_{REQ}$ to obtain the $Cert_{REQ}$, the AAC verifies the $Sig_{REQ}$ by using the $Cert_{REQ}$, and at this time, the $Pub_{REQ}$ may not include the $Cert_{REQ}$. Alternatively, in S612, verification for the $Sig_{REQ}$ may also be changed to be executed in S608 by the AS-REQ firstly, in this case, the $Sig_{REQ}$ is transmitted to the AS-REQ through the AACVeri in S606 and the AS-ACCVeri in S607, the AS-REQ verifies the $Sig_{REQ}$ by using the received $Cert_{REQ}$, and at this time, the $Pub_{REQ}$ may not include the $Cert_{REQ}$.

In the above embodiments, each message may further carry a hash value $HASH_{X\_Y}$, the hash value $HASH_{X\_Y}$ is obtained by a sender entity X of the message calculating a received latest preamble message transmitted by an opposite end entity Y through a hash algorithm, and used for the opposite end entity Y to verify whether the entity X receives the complete latest preamble message. $HASH_{REQ\_AAC}$ represents a hash value of the REQ calculating the received latest preamble message transmitted by the AAC, $HASH_{AAC\_REQ}$ represents a hash value of the AAC calculating the received latest preamble message transmitted by the REQ, $HASH_{AAC\_AS-AAC}$ represents a hash value of the AAC calculating the received latest preamble message transmitted by the AS-AAC, $HASH_{AS-AAC\_AAC}$ represents a hash value of the AS-AAC calculating the received latest preamble message transmitted by the AAC, $HASH_{AS-AAC\_AS-REQ}$ represents a hash value of the AS-AAC calculating the received latest preamble message transmitted by the AS-REQ, and $HASH_{AS-REQ\_AS-AAC}$ represents a hash value of the AS-REQ calculating the received latest preamble message transmitted by the AS-AAC. If the message currently transmitted by the sender entity X is the first message for interaction between the entity X and the entity Y, it means that the entity X has not received a preamble message transmitted by the opposite end entity Y, and the $HASH_{X\_Y}$ in the message may not exist or have no meaning.

Correspondingly, after the opposite end entity Y receives the message transmitted by the entity X, if the message contains the $HASH_{X\_Y}$, when the entity Y has not transmitted the preamble message to the entity X, the entity Y ignores the $HASH_{X\_Y}$; and when the entity Y has transmitted the preamble message to the entity X, the entity Y calculates a hash value of the latest preamble message transmitted to the entity X before by using the hash algorithm locally, and compares the calculated hash value with a hash value $HASH_{X\_Y}$ carried in the received message, if consistent, the subsequent steps are executed, otherwise, it is abandoned, or the authentication process is ended.

In the present disclosure, for the entity X, the preamble message transmitted to the entity X by the opposite end entity Y refers to a received message transmitted by the opposite end entity Y to the entity X before the entity X transmits a message M to the opposite end entity Y; and the latest preamble message transmitted by the opposite end entity Y to the entity X refers to a received latest message transmitted by the opposite end entity Y to the entity X before the entity X transmits the message M to the opposite end entity Y. If the message M transmitted by the entity X to the opposite end entity Y is the first message for interaction between the entity X and the entity Y, before the entity X transmits the message M to the opposite end entity Y, there is no preamble message transmitted by the opposite end entity Y to the entity X.

The optional fields and optional operations in the corresponding embodiments in FIG. 5 and FIG. 6 are presented by "*" in FIG. 5 and FIG. 6 of the accompanying drawings in the specification. The various contents included in the messages mentioned in all the above embodiments are not limited in order, and in the absence of special instructions, the order in which the message receiver operates on the relevant messages and processes the contents included in the messages is not limited.

Figure 7:
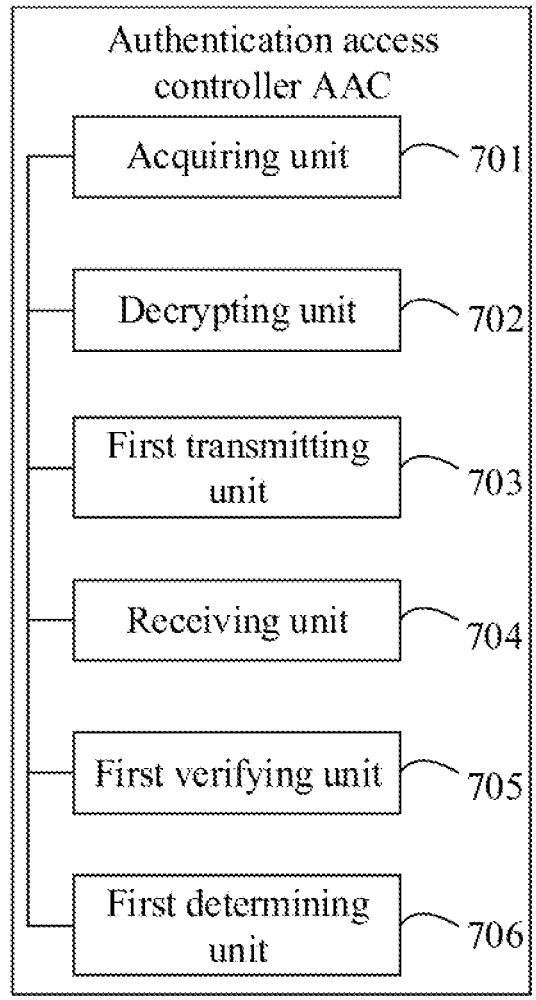
FIG. 7 is a structural block diagram of an authentication access controller AAC provided by an embodiment of the present application.

Based on the embodiments corresponding to FIGS. 1 to 6, referring to FIG. 7, an embodiment of the present application provides an authentication access controller AAC, including: an acquiring unit 701, configured to acquire an identity ciphertext message transmitted by a REQuester, wherein the identity ciphertext message includes identity information ciphertext of the REQuester, and the identity information ciphertext is generated by encrypting information including a digital certificate of the REQuester using a message encryption secret key; a decrypting unit 702, configured to decrypt the identity information ciphertext using the message encryption secret key to obtain the digital certificate of the REQuester; a first transmitting unit 703, configured to transmit a first authentication request message to a first authentication server trusted by the authentication access controller, wherein the first authentication request message includes the digital certificate of the REQuester; a receiving unit 704, configured to receive a first authentication response message transmitted by the first authentication server, wherein the first authentication response message includes authentication result information and a digital signature of the first authentication server, and the authentication result information includes a verification result for the digital certificate of the REQuester; a first verifying unit 705, configured to verify, using a public key of the first authentication server, the digital signature of the first authentication server; and a first determining unit 706, configured to determine, when the verification for the digital signature of the first authentication server is successful, an identity authentication result of the REQuester according to the verification result for the digital certificate.

Optionally, the identity ciphertext message acquired by the acquiring unit 701 further includes the digital signature of the REQuester, and then, before determining, by the first determining unit 706, the identity authentication result of the REQuester, the first determining unit 706 is further configured to determine that the verification for the digital signature of the REQuester is successful.

Optionally, the first determining unit 706 is specifically configured to determine whether the verification for the digital signature of the REQuester is successful according to the following modes: verifying, using the digital certificate of the REQuester obtained by decrypting the identity information ciphertext of the REQuester by the decrypting unit 702, the digital signature of the REQuester, and determining whether the verification for the digital signature of the REQuester is successful according to the verification result; or when the authentication result information further includes the digital certificate of the REQuester, verifying, using the digital certificate of the REQuester in the authentication result information, the digital signature of the REQuester, and determining whether the verification for the digital signature of the REQuester is successful according to the verification result; or when the authentication result information further includes the digital certificate of the REQuester, comparing consistency between the digital certificate of the REQuester obtained by decrypting the identity information ciphertext of the REQuester and the digital certificate of the REQuester in the authentication result information, if consistent, then verifying, using the digital certificate of the REQuester, the digital signature of the REQuester, and determining whether the verification for the digital signature of the REQuester is successful according to the verification result; or when verifying, by a second authentication server trusted by the REQuester using the received digital certificate of the REQuester, the digital signature of the REQuester, and if the receiving unit 704 receives the first authentication response message, determining that the verification for the digital signature of the REQuester is successful.

Optionally, the authentication access controller further includes: a second transmitting unit, configured to transmit a secret key request message to the REQuester, wherein the secret key request message includes a secret key exchange parameter of the authentication access controller, and the identity ciphertext message acquired by the acquiring unit 701 further includes a secret key exchange parameter of the REQuester; and a calculating unit, configured to perform secret key exchange calculation according to a temporary private key corresponding to the secret key exchange parameter of the authentication access controller and a temporary public key included in the secret key exchange parameter of the REQuester to generate a first secret key, and calculate the message encryption secret key by using a secret key derivation algorithm according to the information including the first secret key.

Optionally, the secret key request message transmitted by the second transmitting unit further includes a first random number generated by the authentication access controller; correspondingly, the identity ciphertext message acquired by the acquiring unit 701 further includes a second random number generated by the REQuester; and the calculating unit is specifically configured to calculate the message encryption secret key according to information including the first secret key, the first random number and the second random number.

Optionally, the identity ciphertext message acquired by the acquiring unit 701 further includes the first random number; and the authentication access controller further includes: a second verifying unit, configured to verify consistency between the first random number in the identity ciphertext message and the first random number generated by the authentication access controller, and determine that the verification for the consistency is successful.

Optionally, the secret key request message transmitted by the second transmitting unit further includes security capability parameter information supported by the authentication access controller; and the identity ciphertext message acquired by the acquiring unit 701 further includes a specific security strategy used by the REQuester, and the specific security strategy is determined by the REQuester according to the security capability parameter information.

Optionally, the secret key request message transmitted by the second transmitting unit further includes the identity identifier of at least one authentication server trusted by the authentication access controller; the identity ciphertext message acquired by the acquiring unit 701 further includes the identity identifier of at least one authentication server trusted by the REQuester; and the authentication access controller further includes: a second determining unit, configured to determine a first authentication server participating in identity authentication according to the identity identifier of the at least one authentication server trusted by the REQuester in the identity ciphertext message and the identity identifier of the at least one authentication server trusted by the authentication access controller in the secret key request message.

Optionally, the identity ciphertext message acquired by acquiring unit 701 further includes the identity identifier of at least one authentication server trusted by the REQuester; and the authentication access controller further includes: a third determining unit, configured to determine a first authentication server participating in identity authentication according to the identity identifier of the at least one authentication server trusted by the REQuester and an identity identifier of an authentication server trusted by the authentication access controller.

Optionally, the first authentication request message transmitted by the first transmitting unit 703 further includes an identity identifier of the authentication access controller and/or a first random number generated by the authentication access controller; correspondingly, the first authentication response message received by the receiving unit 704 further includes the identity identifier of the authentication access controller and/or the first random number; and the authentication access controller further includes: a third verifying unit, configured to verify consistency between the identity identifier of the authentication access controller in the first authentication response message and an own identity identifier of the authentication access controller before determining the identity authentication result of the REQuester by the first determining unit 706, and/or, verify consistency between a first random number in the first authentication response message and a first random number generated by the authentication access controller; and determine that the verification for the consistency is successful.

Optionally, a message transmitted by the authentication access controller to the REQuester further includes a hash value calculated by the authentication access controller for a received latest preamble message transmitted by the REQuester; and a message transmitted by the authentication access controller to the first authentication server further includes a hash value calculated by the authentication access controller for a received latest preamble message transmitted by the first authentication server.

Figure 8:
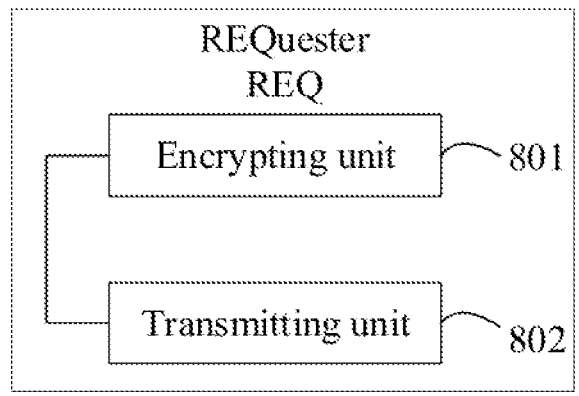
FIG. 8 is a structural block diagram of a REQuester REQ provided by an embodiment of the present application.

Referring to FIG. 8, an embodiment of the present application further provides a REQuester REQ, including: an encrypting unit 801, configured to encrypt information including a digital certificate of the REQuester by using a message encryption secret key to generate identity information ciphertext; and a transmitting unit 802, configured to transmit an identity ciphertext message to an authentication access controller, wherein the identity ciphertext message includes the identity information ciphertext of the REQuester.

Optionally, the REQuester further includes: a receiving unit, configured to receive a secret key request message transmitted by the authentication access controller, wherein the secret key request message includes a secret key exchange parameter of the authentication access controller; and a calculating unit, configured to perform secret key exchange calculation according to a temporary private key corresponding to a secret key exchange parameter of the REQuester and a temporary public key included in the secret key exchange parameter of the authentication access controller to generate a first secret key, and calculate the message encryption secret key by using a secret key derivation algorithm according to information including the first secret key, wherein the identity ciphertext message transmitted by the transmitting unit 802 further includes the secret key exchange parameter of the REQuester.

Optionally, the secret key request message received by the receiving unit further includes a first random number generated by the authentication access controller; the calculating unit is specifically configured to calculate the message encryption secret key according to information including a second random number generated by the REQuester, the first secret key, and the first random number; and the identity ciphertext message transmitted by the transmitting unit 802 further includes the second random number.

Optionally, the secret key request message received by the receiving unit further includes security capability parameter information supported by the authentication access controller, and the REQuester further includes: a first determining unit, configured to determine a specific security strategy used by the REQuester according to the security capability parameter information, wherein the identity ciphertext message transmitted by the transmitting unit 802 further includes the specific security strategy.

Optionally, the secret key request message received by the receiving unit further includes the identity identifier of at least one authentication server trusted by the authentication access controller; and the REQuester further includes: a second determining unit, configured to determine the identity identifier of at least one authentication server trusted by the REQuester according to the identity identifier of the at least one authentication server trusted by the authentication access controller, wherein the identity ciphertext message transmitted by the transmitting unit 802 further includes the identity identifier of the at least one authentication server trusted by the REQuester.

Optionally, the identity ciphertext message transmitted by the transmitting unit 802 further includes the identity identifier of the at least one authentication server trusted by the REQuester.

Optionally, the identity ciphertext message transmitted by the transmitting unit 802 further includes a first random number generated by the authentication access controller.

Optionally, a message transmitted by the REQuester to the authentication access controller further includes a hash value calculated by the REQuester for a received latest preamble message transmitted by the authentication access controller.

When identity information is transmitted between the REQuester and the authentication access controller, confidential processing is performed on the identity information of the REQuester, exposure of the identity information in a network access process is prevented, and it is ensured that private and sensitive information of the REQuester cannot be obtained by an attacker. In addition, by involving the authentication server, while ensuring the confidentiality of the entity identity related information, real-time one-way identity authentication for the REQuester by the authentication access controller is realized, so that a foundation is laid for ensuring that only legal users can access the network.

Figure 9:
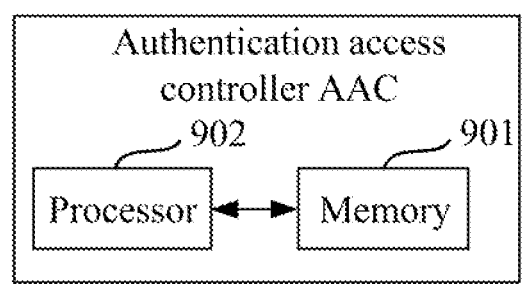
FIG. 9 is a structural block diagram of another authentication access controller AAC provided by an embodiment of the present application.

Referring to FIG. 9, an embodiment of the present application further provides an authentication access controller AAC, including: a memory 901, configured to store a program instruction; and a processor 902, configured to call the program instruction stored in the memory 901 to execute steps executed by the AAC in the above embodiments according to the obtained program.

It should be understood that the authentication access controller may implement the corresponding flows implemented by the AAC in each method of the embodiments of the present application, and for simplicity, it will not be repeated here.

Figure 10:
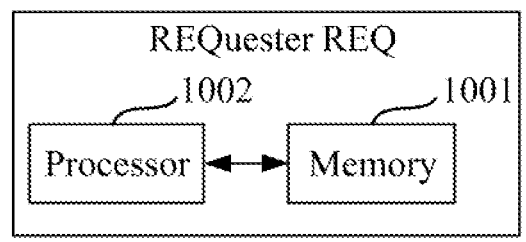
FIG. 10 is a structural block diagram of another REQuester provided by an embodiment of the present application.

Referring to FIG. 10, an embodiment of the present application further provides a REQuester REQ, including: a memory 1001, configured to store a program instruction; and a processor 1002, configured to call the program instruction stored in the memory 1001 to execute steps executed by the REQ in the above embodiments according to the obtained program.

It should be understood that the REQuester may implement the corresponding flows implemented by the REQ in each method of the embodiments of the present application, and for simplicity, it will not be repeated here.

Those of ordinary skill in the art may understand that implementation of all or part of steps in the above method embodiments may be completed through hardware related to the program instruction, the above problem may be stored in a computer readable storage medium, and the program, when being executed, executes the steps including the above method embodiments; and the above storage medium may be at least one of following media: a read-only memory (ROM), an RAM, a magnetic disc, an optical disc or other media that can store program codes.

It needs to be noted that the various embodiments in this description are described in a progressive mode, and the same or similar parts of the various embodiments can be referred to each other. Each embodiment focuses on contents different from other embodiments. In particular, as for device and system embodiments, due to their consistencies and correspondence with the method embodiments, the description is relatively simple. As for related parts, please refer to the partial description of the method embodiments. The above device and system embodiments are merely schematic, the units described as separate components may or may not be physically separated, and the components displayed as units may or may not be physical units, that is, they may be located in one place, or may be distributed to multiple network units. Some or all of the modules may be selected according to actual needs to achieve the purpose of the solution of the embodiment. Those of ordinary skill in the art may understand and implement it without creative labor.

The foregoing description is merely a specific implementation of the present application, but is not intended to limit the scope of protection of the present application. Variation or replacement readily figured out by those skilled in the art well known to them within the technical scope disclosed in the present application falls within the scope of protection of the present application. Therefore, the scope of protection of the present application should be based on the scope of protection of the appended claims.

What is claimed is:

1. A method for identity authentication, comprising:
    acquiring, by an authentication access controller, an identity ciphertext message transmitted by a REQuester, wherein the identity ciphertext message comprises identity information ciphertext of the REQuester, and the identity information ciphertext is generated by encrypting information comprising a digital certificate of the REQuester using a message encryption secret key;
    decrypting, by the authentication access controller, the identity information ciphertext using the message encryption secret key to obtain the digital certificate of the REQuester;
    transmitting, by the authentication access controller, a first authentication request message to a first authentication server trusted by the authentication access controller, wherein the first authentication request message comprises the digital certificate of the REQuester;
    receiving, by the authentication access controller, a first authentication response message transmitted by the first authentication server, wherein the first authentication response message comprises authentication result information and a digital signature of the first authentication server, and the authentication result information comprises a verification result for the digital certificate of the REQuester;
    verifying, by the authentication access controller using a public key of the first authentication server, the digital signature of the first authentication server; and
    if the verification is successful, determining, by the authentication access controller, an identity authentication result of the REQuester according to the verification result for the digital certificate;
    wherein before acquiring, by the authentication access controller, the identity ciphertext message transmitted by the REQuester, the method further comprises:
    transmitting, by the authentication access controller, a secret key request message to the REQuester, wherein the secret key request message comprises a secret key exchange parameter of the authentication access controller;
    performing, by the REQuester, secret key exchange calculation according to a temporary private key corresponding to a secret key exchange parameter of the REQuester and a temporary public key comprised in the secret key exchange parameter of the authentication access controller to generate a first secret key, and calculating, by the REQuester, the message encryption secret key by using a secret key derivation algorithm according to information comprising the first secret key, wherein the identity ciphertext message transmitted by the REQuester to the authentication access controller further comprises the secret key exchange parameter of the REQuester; and
    performing, by the authentication access controller, secret key exchange calculation according to a temporary private key corresponding to the secret key exchange parameter of the authentication access controller and a temporary public key comprised in the secret key exchange parameter of the REQuester to generate the first secret key, and calculating, by the authentication access controller, the message encryption secret key by using the secret key derivation algorithm according to the information comprising the first secret key;
    wherein the secret key request message further comprises a first random number generated by the authentication access controller;
    then the calculating, by the REQuester, the message encryption secret key further comprises:
    calculating, by the REQuester, the message encryption secret key according to information comprising a second random number generated by the REQuester, the first secret key and the first random number;
    correspondingly, the identity ciphertext message further comprises the second random number; and
    then the calculating, by the authentication access controller, the message encryption secret key further comprises:
    calculating, by the authentication access controller, the message encryption secret key according to the information comprising the first secret key, the first random number and the second random number.

2. The method according to claim 1, wherein the identity ciphertext message further comprises the digital signature of the REQuester, and then, before determining, by the authentication access controller, the identity authentication result of the REQuester, the method further comprises:
    determining, by the authentication access controller, that the verification for the digital signature of the REQuester is successful.

3. The method according to claim 2, wherein the authentication access controller determines whether the verification for the digital signature of the REQuester is successful according to following modes:
    verifying, by the authentication access controller using the digital certificate of the REQuester obtained by decrypting the identity information ciphertext of the REQuester, the digital signature of the REQuester, and determining, by the authentication access controller, whether the verification for the digital signature of the REQuester is successful according to the verification result; or
    when the authentication result information further comprises the digital certificate of the REQuester, verifying, by the authentication access controller using the digital certificate of the REQuester in the authentication result information, the digital signature of the REQuester, and determining, by the authentication access controller, whether the verification for the digital signature of the REQuester is successful according to the verification result; or when the authentication result information further comprises the digital certificate of the REQuester, comparing, by the authentication access controller, consistency between the digital certificate of the REQuester obtained by decrypting the identity information ciphertext of the REQuester and the digital certificate of the REQuester in the authentication result information;

if consistent, verifying, by the authentication access controller reusing the digital certificate of the REQuester, the digital signature of the REQuester, and determining, by the authentication access controller, whether the verification for the digital signature of the REQuester is successful according to the verification result; or verifying, by a second authentication server trusted by the REQuester using the received digital certificate of the REQuester, the digital signature of the REQuester, and if the authentication access controller receives the first authentication response message, determining, by the authentication access controller, that the verification for the digital signature of the REQuester is successful.

4. The method according to claim 1, wherein the identity ciphertext message further comprises the first random number; and then before calculating, by the authentication access controller, the message encryption secret key, the method further comprises:

verifying, by the authentication access controller, consistency between the first random number in the identity ciphertext message and the first random number generated by the authentication access controller, and determining, by the verification for the authentication access controller, that the consistency is successful.

5. The method according to claim 1, wherein the secret key request message further comprises security capability parameter information supported by the authentication access controller, and the method further comprises:

determining, by the REQuester, a specific security strategy used by the REQuester according to the security capability parameter information, wherein the identity ciphertext message further comprises the specific security strategy.

6. The method according to claim 1, wherein the secret key request message further comprises the identity identifier of at least one authentication server trusted by the authentication access controller; and the method further comprises:

determining, by the REQuester, the identity identifier of at least one authentication server trusted by the REQuester according to the identity identifier of the at least one authentication server trusted by the authentication access controller; wherein the identity ciphertext message further comprises the identity identifier of the at least one authentication server trusted by the REQuester; and the method further comprises:

determining, by the authentication access controller, the first authentication server participating in identity authentication according to the identity identifier of the at least one authentication server trusted by the REQuester in the identity ciphertext message and the identity identifier of the at least one authentication server trusted by the authentication access controller in the secret key request message.

7. The method according to claim 1, wherein the identity ciphertext message further comprises the identity identifier of at least one authentication server trusted by the REQuester;

and the method further comprises:

determining, by the authentication access controller, the first authentication server participating in identity authentication according to the identity identifier of the at least one authentication server trusted by the REQuester and an identity identifier of an authentication server trusted by the authentication access controller.

8. The method according to claim 1, wherein the first authentication request message further comprises an identity identifier of the authentication access controller and/or a first random number generated by the authentication access controller;

correspondingly, the first authentication response message further comprises the identity identifier of the authentication access controller and/or the first random number; and before determining, by the authentication access controller, the identity authentication result of the REQuester, the method further comprises:

verifying, by the authentication access controller, consistency between the identity identifier of the authentication access controller in the first authentication response message and an own identity identifier of the authentication access controller, and/or, verifying, by the authentication access controller, consistency between a first random number in the first authentication response message and a first random number generated by the authentication access controller; and determining that the verification for the consistency is successful.

9. The method according to claim 1, wherein the first authentication server trusted by the authentication access controller and the second authentication server trusted by the REQuester are the same one authentication server, and the method further comprises:

performing, by the first authentication server, legality verification on the digital certificate of the REQuester to obtain a verification result for the digital certificate, generating, by the first authentication server, the authentication result information according to information comprising the verification result for the digital certificate, calculating, by the first authentication server, to-be-signed data comprising the authentication result information to generate a digital signature of the first authentication server, and generating, by the first authentication server, the first authentication response message according to information comprising the digital signature of the first authentication server and the authentication result information.

10. The method according to claim 1, wherein the first authentication server trusted by the authentication access controller and the second authentication server trusted by the REQuester are two different authentication servers, and the method further comprises:

transmitting, by the first authentication server, a second authentication request message to the second authentication server trusted by the REQuester after the first authentication server receives the first authentication request message, wherein the second authentication request message comprises the digital certificate of the REQuester; performing, by the second authentication server, legality verification on the digital certificate of the REQuester to obtain the verification result for the digital certificate, generating, by the second authentication server, the authentication result information according to information comprising the verification result for the digital certificate, and calculating, by the second authentication server, to-be-signed data comprising the authentication result information to generate a digital signature of the second authentication server;

receiving, by the first authentication server, a second authentication response message transmitted by the second authentication server, wherein the second authentication response message comprises the authentication result information and the digital signature of the second authentication server;

verifying, by the first authentication server, the digital signature of the second authentication server using a public key of the second authentication server; and if the verification is successful, calculating, by the first authentication server, to-be-signed data comprising the authentication result information to generate the digital signature of the first authentication server, and generating, by the first authentication server, the first authentication response message according to information comprising the digital signature of the first authentication server and the authentication result information.

11. The method according to claim 3, further comprising:

a message transmitted by the REQuester to the authentication access controller further comprising a hash value calculated by the REQuester for a received latest preamble message transmitted by the authentication access controller, then when the authentication access controller receives the message transmitted by the REQuester, verifying, by the authentication access controller, the hash value in the received message, and determining, by the authentication access controller, that verification is successful;

a message transmitted by the authentication access controller to the REQuester further comprising a hash value calculated by the authentication access controller for a received latest preamble message transmitted by the REQuester, then when the REQuester receives the message transmitted by the authentication access controller, verifying, by the REQuester, the hash value in the received message, and determining, by the REQuester, that verification is successful;

a message transmitted by the authentication access controller to the first authentication server further comprising a hash value calculated by the authentication access controller for a received latest preamble message transmitted by the first authentication server, then when the first authentication server receives the message transmitted by the authentication access controller, verifying, by the first authentication server, the hash value in the received message, and determining, by the first authentication server, that verification is successful;

a message transmitted by the first authentication server to the authentication access controller further comprising a hash value calculated by the first authentication server for a received latest preamble message transmitted by the authentication access controller, then when the authentication access controller receives the message transmitted by the first authentication server, verifying, by the authentication access controller, the hash value in the received message, and determining, by the authentication access controller, that verification is successful;

a message transmitted by the first authentication server to the second authentication server further comprising a hash value calculated by the first authentication server for a received latest preamble message transmitted by the second authentication server, then when the second authentication server receives the message transmitted by the first authentication server, verifying, by the second authentication server, the hash value in the received message, and determining, by the second authentication server, that verification is successful; and a message transmitted by the second authentication server to the first authentication server further comprising a hash value calculated by the second authentication server for a received latest preamble message transmitted by the first authentication server, then when the first authentication server receives the message transmitted by the second authentication server, verifying, by the first authentication server, the hash value in the received message, and determining, by the first authentication server, that verification is successful.

12. An authentication access controller, comprising:

a memory, configured to store a program instruction; and a processor, configured to call the program instruction stored in the memory to:

acquire an identity ciphertext message transmitted by a REQuester, wherein the identity ciphertext message comprises identity information ciphertext of the REQuester, and the identity information ciphertext is generated by encrypting information comprising a digital certificate of the REQuester using a message encryption secret key;

decrypt the identity information ciphertext using the message encryption secret key to obtain the digital certificate of the REQuester;

transmit a first authentication request message to a first authentication server trusted by the authentication access controller, wherein the first authentication request message comprises the digital certificate of the REQuester;

receive a first authentication response message transmitted by the first authentication server, wherein the first authentication response message comprises authentication result information and a digital signature of the first authentication server, and the authentication result information comprises a verification result for the digital certificate of the REQuester;

verify, using a public key of the first authentication server, the digital signature of the first authentication server; and determine, when the verification for the digital signature of the first authentication server is successful, an identity authentication result of the REQuester according to the verification result for the digital certificate;

wherein the processor is further configured to call the program instruction stored in the memory to, before acquiring the identity ciphertext message transmitted by the REQuester, transmit a secret key request message to the REQuester, wherein the secret key request message comprises a secret key exchange parameter of the authentication access controller;

perform secret key exchange calculation according to a temporary private key corresponding to a secret key exchange parameter of the REQuester and a temporary public key comprised in the secret key exchange parameter of the authentication access controller to generate a first secret key, and calculate the message encryption secret key by using a secret key derivation algorithm according to information comprising the first secret key, wherein the identity ciphertext message transmitted by the REQuester to the authentication access controller further comprises the secret key exchange parameter of the REQuester; and perform secret key exchange calculation according to a temporary private key corresponding to the secret key exchange parameter of the authentication access controller and a temporary public key comprised in the secret key exchange parameter of the REQuester to generate the first secret key, and calculate the message encryption secret key by using the secret key derivation algorithm according to the information comprising the first secret key;

wherein the secret key request message further comprises a first random number generated by the authentication access controller;

then the processor is further configured to call the program instruction stored in the memory to:

calculate the message encryption secret key according to information comprising a second random number generated by the REQuester, the first secret key and the first random number;

correspondingly, the identity ciphertext message further comprises the second random number; and then the processor is further configured to call the program instruction stored in the memory to:

calculate the message encryption secret key according to the information comprising the first secret key, the first random number and the second random number.

13. A REQuester, comprising:

a memory, configured to store a program instruction; and a processor, configured to call the program instruction stored in the memory to:

encrypt information comprising a digital certificate of the REQuester by using a message encryption secret key to generate identity information ciphertext; and transmit an identity ciphertext message to an authentication access controller, wherein the identity ciphertext message comprises the identity information ciphertext of the REQuester;

wherein the processor is configured to call the program instruction stored in the memory to:

receive a secret key request message transmitted by the authentication access controller. wherein the secret key request message comprises a secret key exchange parameter of the authentication access controller; and perform secret key exchange calculation according to a temporary private key corresponding to a secret key exchange parameter of the REQuester and a temporary public key comprised in the secret key exchange parameter of the authentication access controller to generate a first secret key, and calculate the message encryption secret key by using a secret key derivation algorithm according to information comprising the first secret key, wherein the identity ciphertext message further comprises a secret key exchange parameter of the REQuester.

14. The REQuester according to claim 13, wherein the secret key request message further comprises a first random number generated by the authentication access controller;

wherein the processor is configured to call the program instruction stored in the memory to calculate the message encryption secret key according to information comprising a second random number generated by the REQuester, the first secret key, and the first random number; and the identity ciphertext message further comprises the second random number.

15. The REQuester according to claim 13, wherein the secret key request message further comprises the identity identifier of at least one authentication server trusted by the authentication access controller; and wherein the processor is configured to call the program instruction stored in the memory to:

determine the identity identifier of at least one authentication server trusted by the REQuester according to the identity identifier of the at least one authentication server trusted by the authentication access controller, wherein the identity ciphertext message further comprises the identity identifier of the at least one authentication server trusted by the REQuester.

16. The REQuester according to claim 13, wherein the identity ciphertext message further comprises the identity identifier of at least one authentication server trusted by the REQuester.

17. The REQuester according to claim 13, wherein a message transmitted by the REQuester to the authentication access controller further comprises a hash value calculated by the REQuester for a received latest preamble message transmitted by the authentication access controller.

18. The authentication access controller according to claim 12, wherein the identity ciphertext message further comprises the digital signature of the REQuester, and then, the processor is configured to call the program instruction stored in the memory to, before determining the identity authentication result of the REQuester, determine that the verification for the digital signature of the REQuester is successful.

19. The REQuester according to claim 13, wherein the secret key request message further comprises security capability parameter information supported by the authentication access controller, and the REQuester further comprises:

wherein the processor is configured to call the program instruction stored in the memory to determine a specific security strategy used by the REQuester according to the security capability parameter information, wherein the identity ciphertext message further comprises the specific security strategy.

20. The REQuester according to claim 14, wherein the identity ciphertext message further comprises a first random number generated by the authentication access controller.

* * * * *